US010825268B2

(12) United States Patent
Covington

(10) Patent No.: US 10,825,268 B2
(45) Date of Patent: Nov. 3, 2020

(54) METHOD AND SYSTEM FOR DISPLAYING AND USING PID GRAPH INDICATORS

(71) Applicant: Snap-on Incorporated, Kenosha, WI (US)

(72) Inventor: Joshua C. Covington, San Juan Bautista, CA (US)

(73) Assignee: Snap-on Incorporated, Kenosha, WI (US)

(*) Notice: Subject to any disclaimer, the term of this patent is extended or adjusted under 35 U.S.C. 154(b) by 0 days.

(21) Appl. No.: 16/231,216

(22) Filed: Dec. 21, 2018

(65) Prior Publication Data

US 2019/0122459 A1 Apr. 25, 2019

Related U.S. Application Data

(63) Continuation of application No. 15/673,619, filed on Aug. 10, 2017, now Pat. No. 10,163,280.

(51) Int. Cl.

| | |
|---|---|
| ***G07C 5/08*** | (2006.01) |
| ***G06Q 10/00*** | (2012.01) |
| ***G06T 11/20*** | (2006.01) |
| ***G06F 3/0482*** | (2013.01) |
| ***G06F 3/0484*** | (2013.01) |
| ***G07C 5/12*** | (2006.01) |
| ***G06Q 50/30*** | (2012.01) |

(52) U.S. Cl.

CPC ......... *G07C 5/0825* (2013.01); *G06F 3/0482* (2013.01); *G06F 3/04847* (2013.01); *G06Q 10/20* (2013.01); *G06Q 50/30* (2013.01); *G06T 11/206* (2013.01); *G07C 5/12* (2013.01)

(58) Field of Classification Search

USPC ........................................................ 701/32.8

See application file for complete search history.

(56) References Cited

U.S. PATENT DOCUMENTS 5,869,776 A 2/1999 Vuong
7,020,546 B2 3/2006 Nagai (Continued)

OTHER PUBLICATIONS

Introduction to OBD II and Second Generation Scan Tools, NAPA Institute of Automotive Technology, 1998, pp. 9-28, 31-154*.

(Continued)

*Primary Examiner* — Tyler D Paige

(74) *Attorney, Agent, or Firm* — McDonnell Boehnen Hulbert & Berghoff LLP

(57) ABSTRACT

An example method includes receiving, at a computing system, parameters from a vehicle, wherein the parameters correspond to a set of associated parameter identifiers (PIDs), and determining, by the computing system, one or more thresholds for one or more PIDs of the set of associated PIDs. The example method additionally includes determining, by the computing system, one or more indicators displayable on a first graph of parameters corresponding to a first PID of the set of associated PIDs. For instance, at least one indicator of the one or more indicators represents a parameter corresponding to a second PID of the set of associated PIDs breaching a threshold associated with the second PID. The example method further includes displaying, by the computing system on a graphical user interface, the first graph of parameters corresponding to the first PID and the one or more indicators on the first graph.

19 Claims, 18 Drawing Sheets

(56) References Cited

U.S. PATENT DOCUMENTS

| | | | | |
|---|---|---|---|---|
| 7,953,530 | B1 | 5/2011 | Pederson | |
| 9,330,507 | B2 * | 5/2016 | Alberry | G07C 5/0825 |
| 9,342,934 | B2 | 5/2016 | Chen | |
| 9,632,656 | B2 * | 4/2017 | Covington | G06F 3/04812 |
| 9,684,447 | B2 * | 6/2017 | Covington | G06F 3/04886 |
| 9,880,707 | B2 * | 1/2018 | Covington | G06F 3/0482 |
| 9,933,915 | B2 * | 4/2018 | Covington | G06F 3/04817 |
| 2004/0172177 | A1 | 9/2004 | Nagai | |
| 2006/0030981 | A1 | 2/2006 | Robb | |
| 2007/0100520 | A1 * | 5/2007 | Shah | G07C 5/008 701/31.4 |
| 2009/0259358 | A1 | 10/2009 | Andreasen | |
| 2010/0076644 | A1 | 3/2010 | Cahill | |
| 2010/0082296 | A1 * | 4/2010 | Tracey | F02D 41/1497 702/183 |
| 2010/0138701 | A1 * | 6/2010 | Costantino | G05B 23/0272 714/49 |
| 2011/0035094 | A1 | 2/2011 | Van Den Berg | |
| 2012/0047458 | A1 * | 2/2012 | Alberry | G07C 5/0825 715/786 |
| 2014/0075356 | A1 * | 3/2014 | Gray | G07C 5/008 715/771 |
| 2014/0075362 | A1 | 3/2014 | Gray | |
| 2014/0277908 | A1 | 9/2014 | Fish | |
| 2016/0124587 | A1 * | 5/2016 | Covington | G06F 3/0482 345/440 |
| 2016/0124605 | A1 * | 5/2016 | Covington | G06F 3/04812 345/173 |
| 2016/0124609 | A1 * | 5/2016 | Covington | G06F 3/04817 345/651 |
| 2016/0124612 | A1 | 5/2016 | Covington | |
| 2016/0124635 | A1 * | 5/2016 | Covington | G06F 3/04886 345/440 |
| 2017/0098199 | A1 * | 4/2017 | Merg | G06F 3/04812 |
| 2017/0098200 | A1 * | 4/2017 | Merg | G06Q 10/20 |
| 2017/0103101 | A1 | 4/2017 | Mason | |

OTHER PUBLICATIONS

Seyfert, K., "OBD II includes many helpful diagnostic trouble codes, designed to identify the possible causes of hundreds of potential system faults. But can it correctly identify a loose nut behind the wheel?" Trouble Shooter, Motor, Oct. 2015, p. 4 and 6*.

Seyfert, K., "OBD II's self-diagnostic capabilities have been a real boon to repair on many vehicles. But the systems on some early vehicles can really throw you a curve," Trouble Shooter, Motor, Jun. 2005, p. 6 and 8*.

Parvathy, A.R., "Thirst for knowledge—SAE J1979 Protocol," downloaded from world wide web at https://happilyembedded.wordpress.com/2015/07/23/thirst-for-knowledge-sae-j1979-protocol/, Jul. 23, 2015*.

Seyfert, K., "OBD II Generic PID Diagnosis," Motor, downloaded from world wide web at https://www.motor.com/magazine-summary/obd-ii-generic-pid-diagnosis-september-2007/, Sep. 2007*.

OBD-11 Resource, "OBD-11 software resources for developers and users," downloaded from world wide web at http://obdcon.sourceforge.nel/201 0/06/obd-ii-pids/, Jun. 2010*.

International Search Report and Written Opinion for corresponding International Patent Application No. PCT/US2018/045385, European Patent Office, dated Oct. 19, 2018*.

International Preliminary Report on Patentability and Written Opinion for corresponding PCT application No. PCT/US2018/045385, dated Feb. 20, 2020.

* cited by examiner

Figure 7:
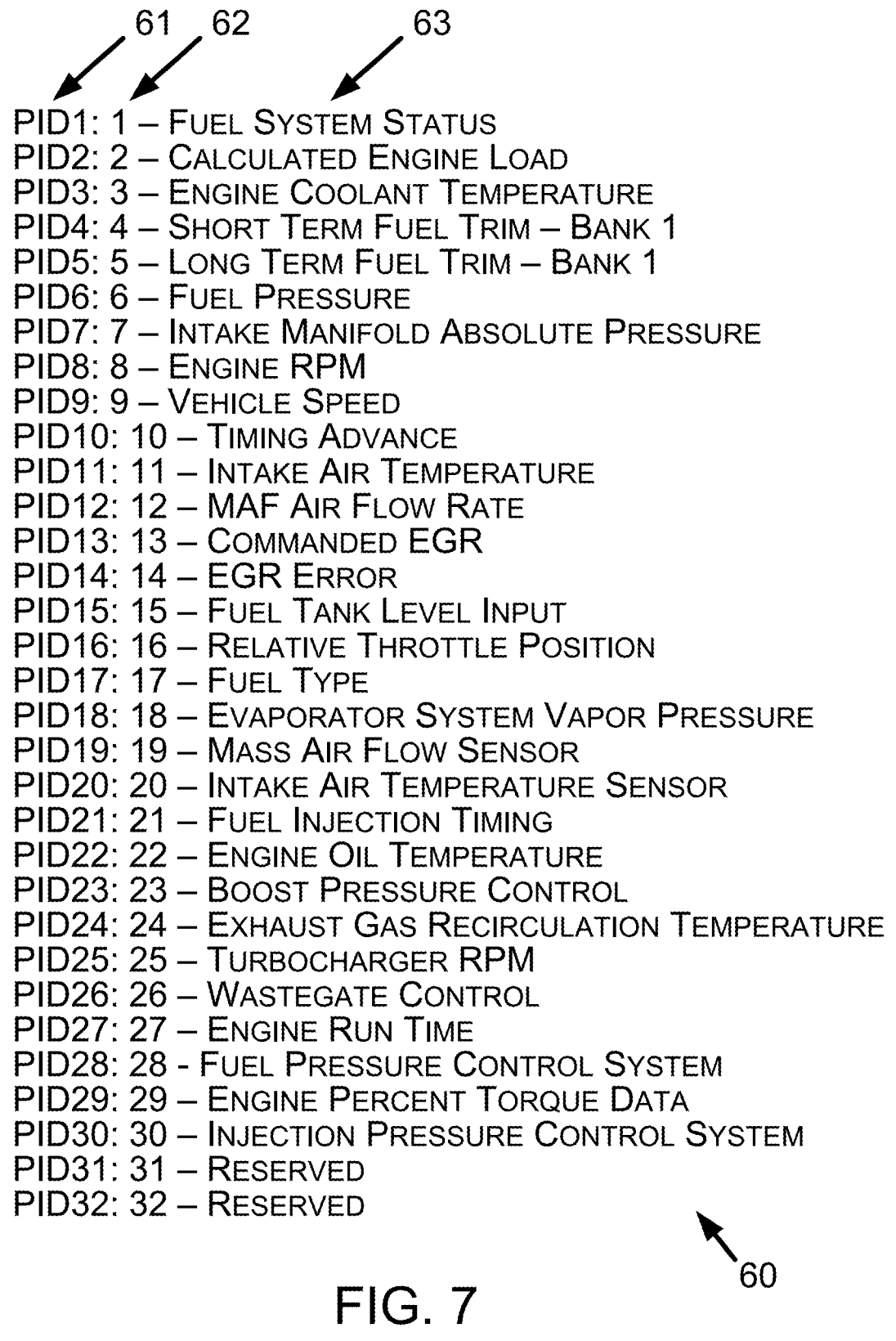

PID1: 1 – FUEL SYSTEM STATUS
PID2: 2 – CALCULATED ENGINE LOAD
PID3: 3 – ENGINE COOLANT TEMPERATURE
PID4: 4 – SHORT TERM FUEL TRIM – BANK 1
PID5: 5 – LONG TERM FUEL TRIM – BANK 1
PID6: 6 – FUEL PRESSURE
PID7: 7 – INTAKE MANIFOLD ABSOLUTE PRESSURE
PID8: 8 – ENGINE RPM
PID9: 9 – VEHICLE SPEED
PID10: 10 – TIMING ADVANCE
PID11: 11 – INTAKE AIR TEMPERATURE
PID12: 12 – MAF AIR FLOW RATE
PID13: 13 – COMMANDED EGR
PID14: 14 – EGR ERROR
PID15: 15 – FUEL TANK LEVEL INPUT
PID16: 16 – RELATIVE THROTTLE POSITION
PID17: 17 – FUEL TYPE
PID18: 18 – EVAPORATOR SYSTEM VAPOR PRESSURE
PID19: 19 – MASS AIR FLOW SENSOR
PID20: 20 – INTAKE AIR TEMPERATURE SENSOR
PID21: 21 – FUEL INJECTION TIMING
PID22: 22 – ENGINE OIL TEMPERATURE
PID23: 23 – BOOST PRESSURE CONTROL
PID24: 24 – EXHAUST GAS RECIRCULATION TEMPERATURE
PID25: 25 – TURBOCHARGER RPM
PID26: 26 – WASTEGATE CONTROL
PID27: 27 – ENGINE RUN TIME
PID28: 28 - FUEL PRESSURE CONTROL SYSTEM
PID29: 29 – ENGINE PERCENT TORQUE DATA
PID30: 30 – INJECTION PRESSURE CONTROL SYSTEM
PID31: 31 – RESERVED
PID32: 32 – RESERVED

Figure 8:
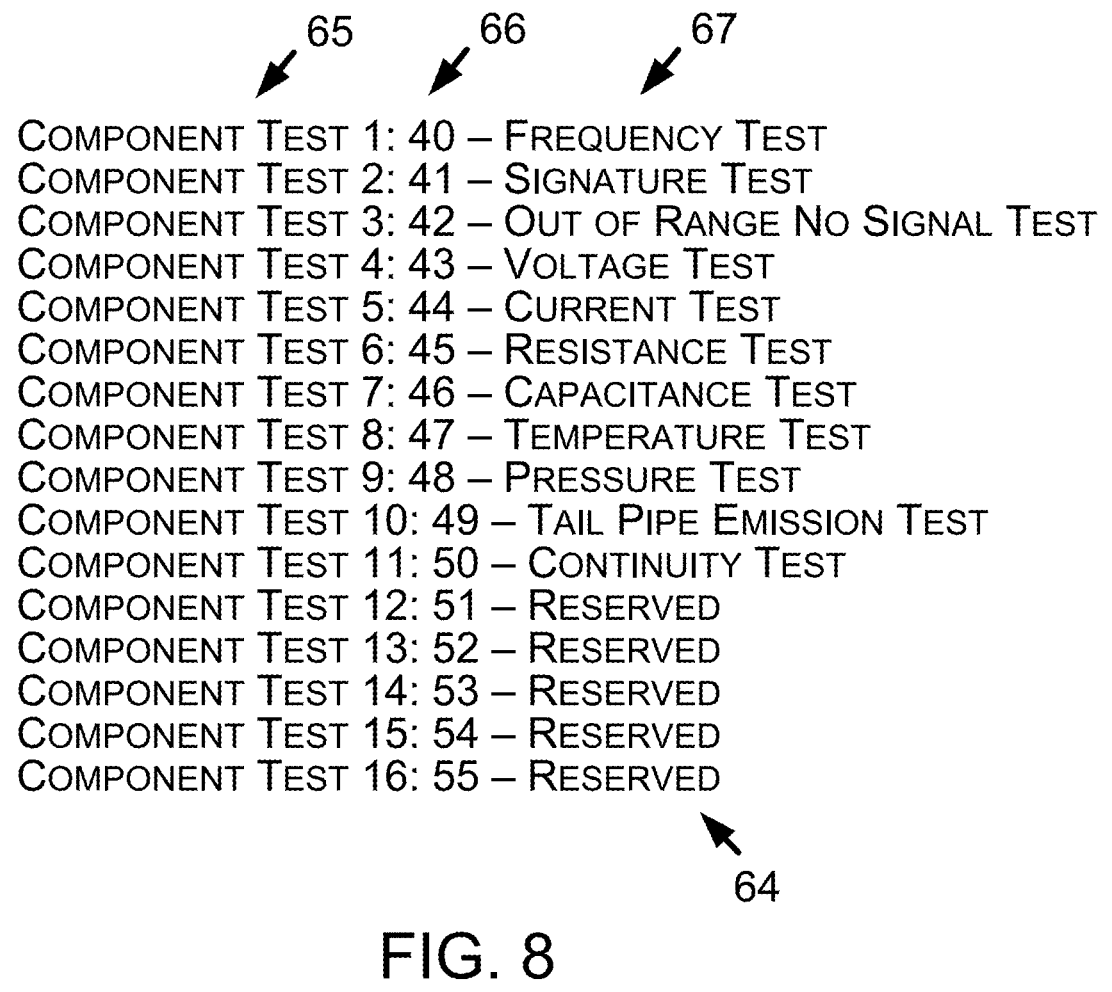

COMPONENT TEST 1: 40 – FREQUENCY TEST
COMPONENT TEST 2: 41 – SIGNATURE TEST
COMPONENT TEST 3: 42 – OUT OF RANGE NO SIGNAL TEST
COMPONENT TEST 4: 43 – VOLTAGE TEST
COMPONENT TEST 5: 44 – CURRENT TEST
COMPONENT TEST 6: 45 – RESISTANCE TEST
COMPONENT TEST 7: 46 – CAPACITANCE TEST
COMPONENT TEST 8: 47 – TEMPERATURE TEST
COMPONENT TEST 9: 48 – PRESSURE TEST
COMPONENT TEST 10: 49 – TAIL PIPE EMISSION TEST
COMPONENT TEST 11: 50 – CONTINUITY TEST
COMPONENT TEST 12: 51 – RESERVED
COMPONENT TEST 13: 52 – RESERVED
COMPONENT TEST 14: 53 – RESERVED
COMPONENT TEST 15: 54 – RESERVED
COMPONENT TEST 16: 55 – RESERVED

Figure 9:
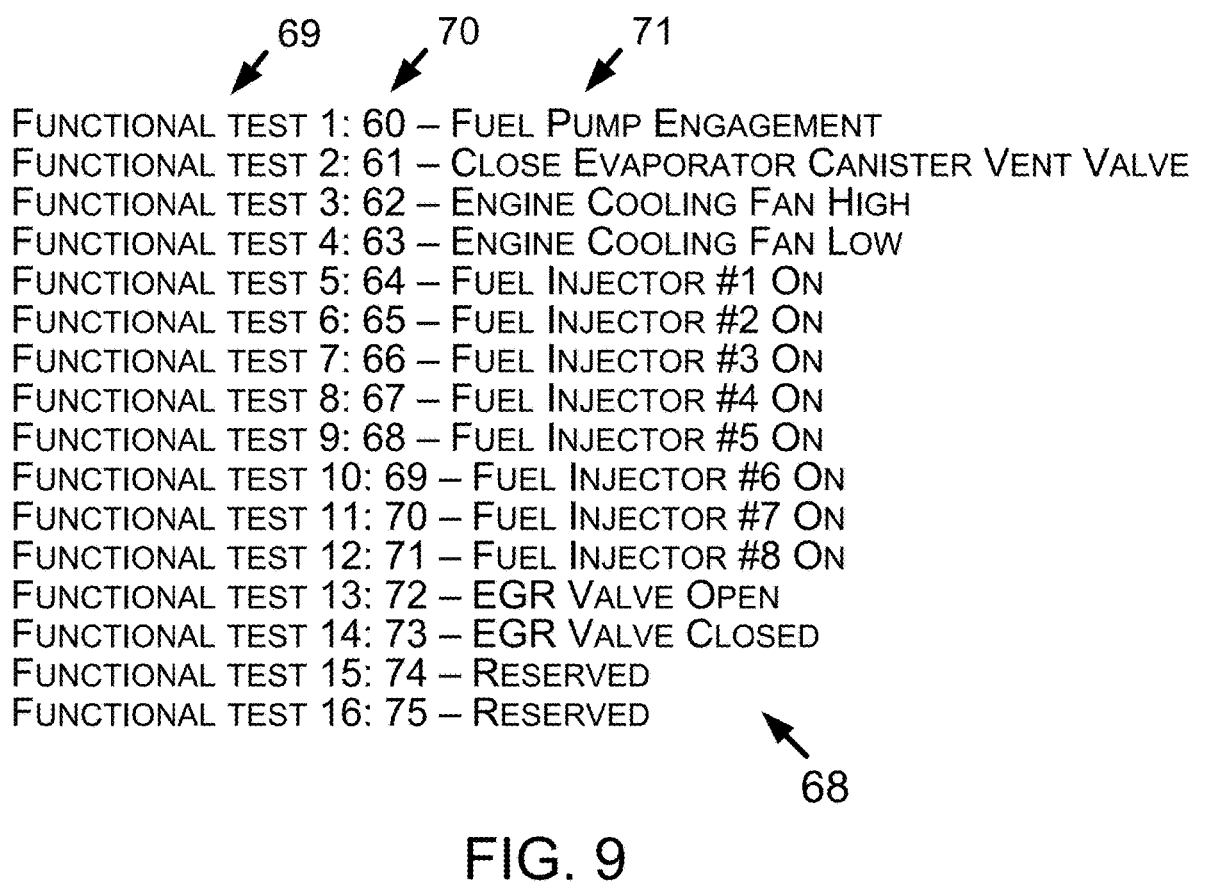

FUNCTIONAL TEST 1: 60 – FUEL PUMP ENGAGEMENT
FUNCTIONAL TEST 2: 61 – CLOSE EVAPORATOR CANISTER VENT VALVE
FUNCTIONAL TEST 3: 62 – ENGINE COOLING FAN HIGH
FUNCTIONAL TEST 4: 63 – ENGINE COOLING FAN LOW
FUNCTIONAL TEST 5: 64 – FUEL INJECTOR #1 ON
FUNCTIONAL TEST 6: 65 – FUEL INJECTOR #2 ON
FUNCTIONAL TEST 7: 66 – FUEL INJECTOR #3 ON
FUNCTIONAL TEST 8: 67 – FUEL INJECTOR #4 ON
FUNCTIONAL TEST 9: 68 – FUEL INJECTOR #5 ON
FUNCTIONAL TEST 10: 69 – FUEL INJECTOR #6 ON
FUNCTIONAL TEST 11: 70 – FUEL INJECTOR #7 ON
FUNCTIONAL TEST 12: 71 – FUEL INJECTOR #8 ON
FUNCTIONAL TEST 13: 72 – EGR VALVE OPEN
FUNCTIONAL TEST 14: 73 – EGR VALVE CLOSED
FUNCTIONAL TEST 15: 74 – RESERVED
FUNCTIONAL TEST 16: 75 – RESERVED

Figure 10:
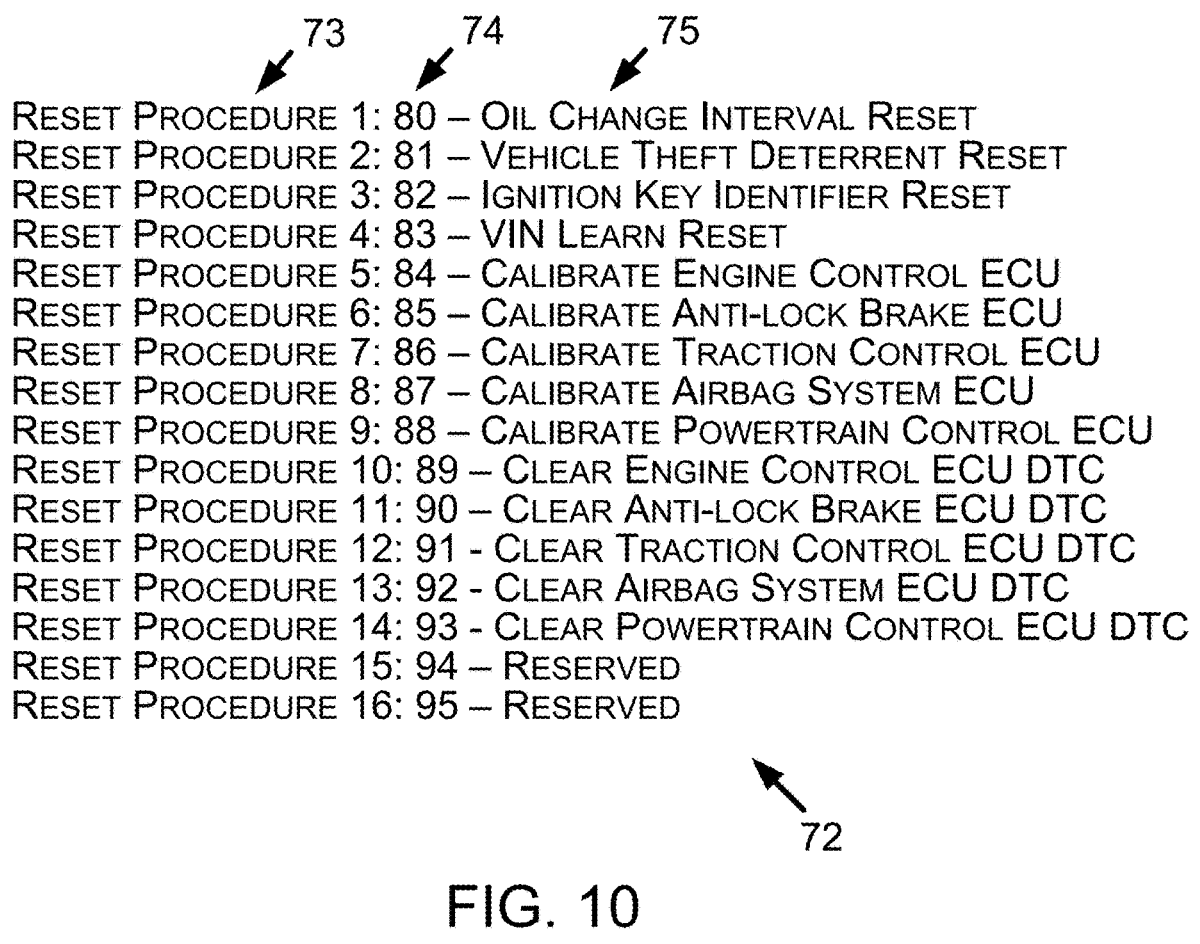

RESET PROCEDURE 1: 80 – OIL CHANGE INTERVAL RESET
RESET PROCEDURE 2: 81 – VEHICLE THEFT DETERRENT RESET
RESET PROCEDURE 3: 82 – IGNITION KEY IDENTIFIER RESET
RESET PROCEDURE 4: 83 – VIN LEARN RESET
RESET PROCEDURE 5: 84 – CALIBRATE ENGINE CONTROL ECU
RESET PROCEDURE 6: 85 – CALIBRATE ANTI-LOCK BRAKE ECU
RESET PROCEDURE 7: 86 – CALIBRATE TRACTION CONTROL ECU
RESET PROCEDURE 8: 87 – CALIBRATE AIRBAG SYSTEM ECU
RESET PROCEDURE 9: 88 – CALIBRATE POWERTRAIN CONTROL ECU
RESET PROCEDURE 10: 89 – CLEAR ENGINE CONTROL ECU DTC
RESET PROCEDURE 11: 90 – CLEAR ANTI-LOCK BRAKE ECU DTC
RESET PROCEDURE 12: 91 - CLEAR TRACTION CONTROL ECU DTC
RESET PROCEDURE 13: 92 - CLEAR AIRBAG SYSTEM ECU DTC
RESET PROCEDURE 14: 93 - CLEAR POWERTRAIN CONTROL ECU DTC
RESET PROCEDURE 15: 94 – RESERVED
RESET PROCEDURE 16: 95 – RESERVED

METHOD AND SYSTEM FOR DISPLAYING AND USING PID GRAPH INDICATORS

CROSS-REFERENCE TO RELATED APPLICATIONS

The present application is a continuation of U.S. application Ser. No. 15/673,619, filed on Aug. 10, 2017, the contents of which are entirely incorporated herein by reference.

BACKGROUND

Most vehicles are serviced at least once during their useful life. In many instances, a vehicle is serviced at a facility with professional mechanics (e.g., technicians), though in other instances, technicians and/or other professionals (or non-professionals) who are servicing the vehicle can do so at other locations, such as on the road. The technicians can use any of a variety of computerized tools and/or non-computerized tools to service (e.g., repair) any of the wide variety of mechanical vehicle components on a vehicle. While servicing a vehicle, a technician sometimes needs information for diagnosing and/or repairing the vehicle, and for post-repair activities performed to the repaired vehicle. The technician may use a vehicle information system that provides parameter identifier (PID) values. As such, a technician may require the ability to observe and switch between displayable parameters related to different PIDs while servicing the vehicle.

OVERVIEW

Several example embodiments relate to a vehicle scan tool (VST) capable of obtaining vehicle data parameters (VDP) that correspond to a set of associated parameter identifiers (PIDs) values from a vehicle. The VST is further capable of determining one or more thresholds for one or more PIDs of the set of associated PIDs and determining indicators that are displayable on at least one graph representing VDP corresponding to a given PID of the set of associated PIDS. Particularly, the indicators displayed on the graph representing the given PID may be selectable by a user of the VST and may include one or more indicators that represent parameters corresponding to other PIDs of the set of associated PIDs. In turn, upon receiving a selection of an indicator displayed on the graph, the VST may further display a popup box of options that include options for the user to subsequently select. In particular, the popup box may include options for the VST to perform a functional or component test or to display another graph of parameters related to a PID associated with the selected indicator. In some instances, the VST may display options in other formats, such as new window or other graphical representations.

Viewed from one aspect, an example embodiment takes the form of a method comprising receiving, at a computing system, parameters from a vehicle, wherein the parameters correspond to a set of associated parameter identifiers (PIDs). The method further includes determining, by the computing system, one or more thresholds for one or more PIDs of the set of associated PIDs, and determining, by the computing system, one or more indicators displayable on a first graph of parameters corresponding to a first PID of the set of associated PIDs, wherein at least one indicator of the one or more indicators represents a parameter corresponding to a second PID of the set of associated PIDs breaching a threshold associated with the second PID. The method additionally includes displaying, by the computing system on a display interface, the first graph of parameters corresponding to the first PID and the one or more indicators on the first graph.

Viewed from another aspect, an example embodiment takes the form of a system comprising a display interface, one or more processors, a non-transitory computer readable medium, and program instructions stored on the non-transitory computer readable medium. The program instructions may be executable by the one or more processors to receive parameters from a vehicle, wherein the parameters correspond to a set of associated parameter identifiers (PIDs). The program instructions may be further executable by the one or more processors to determine one or more thresholds for one or more PIDs of the set of associated PIDs, and determine one or more indicators displayable on a first graph of parameters corresponding to a first PID of the set of associated PIDs, wherein at least one indicator of the one or more indicators represents a parameter corresponding to a second PID of the set of associated PIDs breaching a threshold associated with the second PID. The program instructions may be additionally executable by the one or more processors to display, on the display interface, the first graph of parameters corresponding to the first PID and the one or more indicators on the first graph.

Viewed from yet another aspect, an example embodiment takes the form of a non-transitory computer readable medium having stored therein instructions executable by one or more processors to cause a computing system to perform functions. The functions include receiving parameters from a vehicle, wherein the parameters correspond to a set of associated parameter identifiers (PIDs). The functions additionally include determining one or more thresholds for one or more PIDs of the set of associated PIDs, and determining one or more indicators displayable on a first graph of parameters corresponding to a first PID of the set of associated PIDs, wherein at least one indicator of the one or more indicators represents a parameter corresponding to a second PID of the set of associated PIDs breaching a threshold associated with the second PID. The functions further include displaying, on a display interface, the first graph of parameters corresponding to the first PID and the one or more indicators on the first graph.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 7 shows an example PID index.

FIG. 8 shows an example component test index.

FIG. 9 shows an example functional test index.

FIG. 10 shows an example reset procedure index.

DETAILED DESCRIPTION

I. Introduction

This description describes several example embodiments including, but not limited to, example embodiments that pertain to determining and displaying indicators that represent parameters corresponding to various PIDs within a set of associated PIDs. Particularly, a computing system (e.g., a VST) can receive parameters from a vehicle that represent a set of associated PIDs. The VST may further determine selectable indicators that represent parameters of the PIDs, such as breaches of a threshold associated with a given PID. The VST may further display the indicators on a graph or multiple graphs that represent parameters for one or more PIDS of the set of associated PIDs. For example, the VST may position and display indicators on a VDP line graph that corresponds a given PID. The indicators displayed on the VDP line graph may include one or more indicators that represent parameters corresponding to other PIDs of the set of associated PIDS. For instance, an indicator can represent a parameter breaching a threshold associated with another PID in the set of associated PIDs. As such, when the VST receives a selection of an indicator by a user, the VST may further display options associated with the selected indicator. Accordingly, upon receiving a subsequent selection of a given option of the displayed options by the user, the VST may further perform an action associated with the selected indicator, such as a functional test, a component test, or displaying a graph representative of the PID associated with the selected indicator, among other possibilities.

II. Example Systems

Figure 1:
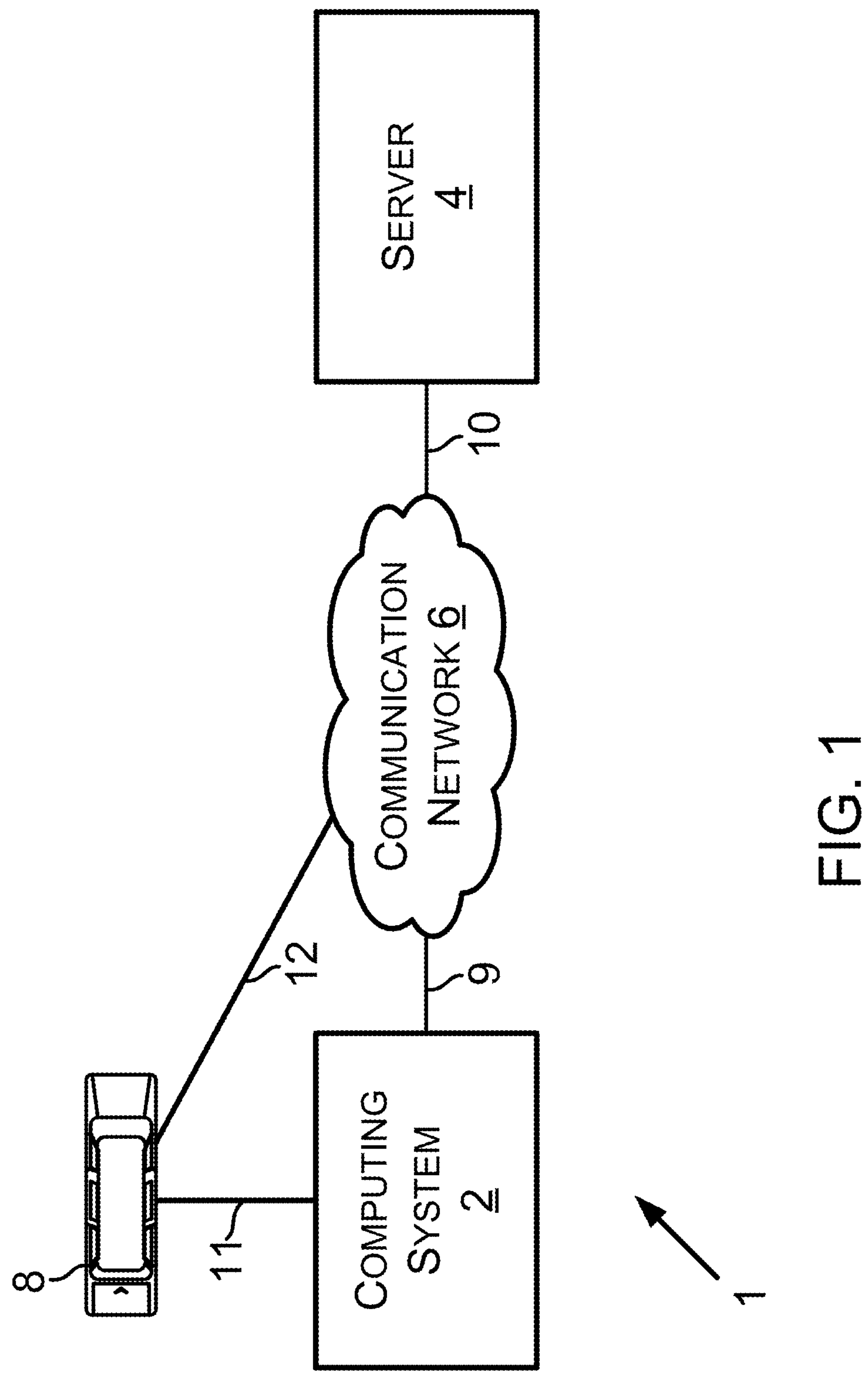
FIG. 1 is a diagram showing an example operating environment in which the example embodiments can operate.

FIG. 1 is a diagram showing an example operating environment 1 in which the example embodiments can operate. As shown, the operating environment 1 includes a computing system 2, a server 4, a communication network 6, a vehicle 8, and communication links 9, 10, 11, 12, but may include more or fewer elements within other example embodiments.

The computing system 2 can take various forms, such as a specialty computing system specifically configured in whole or in part for the purpose of servicing vehicles (e.g., the vehicle 8). In some instances, a specialty computing system can include unique elements for facilitating servicing of vehicles or can otherwise be uniquely configured in such a way that distinguishes the specialty computing from another type of computing system. In some examples, a specialty computing system can be configured to perform various functions associated with servicing vehicles, can include communication interfaces with other systems/servers/networks associated with servicing vehicles, and can be configured to send and receive data over those interfaces in accordance with one or more protocols associated with servicing vehicles. Alternatively, in some examples, the computing system 2 can be a general purpose, non-specialty computing system, such as a general purpose smart phone, desktop computer, laptop computer, or the like. As a general matter, the computing system 2—specialty or general purpose—can take the form of a hand-held device, laptop computer, desktop computer, and/or another type of device.

The operating environment 1 further includes a server 4 connected to the computing system 2 via the communication network 6. As such, the server 4 can take various forms as well, such as a specialty server specifically/uniquely configured for the purpose of servicing vehicles, or a general-purpose server. In some examples, the server 4 can be scaled so as to be able to serve any number of devices, such as one computing system (as shown in FIG. 1), one hundred computing systems, one thousand computing systems, or some other number of computing systems.

The communication network 6 can include the communication links 9, 10, 11, 12 as well as other communication links (not shown in FIG. 1). The communication network 6 and the communication links 9, 10, 11, 12 can include various network elements such as switches, modems, gateways, antennas, cables, transmitters, and receivers. The communication network 6 can comprise a wide area network (WAN) that can carry data using packet-switched and/or circuit-switched technologies. The WAN can include an air interface and/or wire to carry the data. The communication network 6 can comprise a network or at least a portion of a network that carries out communications using a Transmission Control Protocol (TCP) and the Internet Protocol (IP), such as the communication network commonly referred to as the Internet. Additionally or alternatively, the communication network can comprise a local area network (LAN), private or otherwise.

The operating environment 1 further includes the vehicle 8 shown in communication with the computing system 2 and the communication network 6. A vehicle, such as vehicle 8, is a mobile machine that can be used to transport a person, people, and/or cargo. As an example, any vehicle described herein can be driven and/or otherwise guided along a path (e.g., a paved road or otherwise) on land, in water, in the air, and/or outer space. As another example, any vehicle described herein can be wheeled, tracked, railed, and/or skied. As yet another example, any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, and/or a farm machine.

As an example embodiment, the vehicle 8 can be guided along a path can include a van (such as a dry or refrigerated van), a tank trailer, a platform trailer, or an automobile carrier. As still yet another example, any vehicle discussed herein can include or use any appropriate voltage or current source, such as a battery, an alternator, a fuel cell, and the like, providing any appropriate current or voltage, such as about 12 volts, about 42 volts, and the like. As still yet another example, any vehicle discussed herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle discussed herein can include an electronic control unit (ECU), a data link connector (DLC), and a vehicle communication link that connects the DLC to the ECU.

A vehicle manufacturer can build various quantities of vehicles each calendar year (i.e., January 1st to December 31st). In some instances, a vehicle manufacturer defines a model year for a particular vehicle model to be built. The model year can start on a date other than January 1st and/or can end on a date other than December 31st. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle using particular vehicle identifying information. These other features can be identified in various manners, such as a regular production option (RPO) code, such as the RPO codes defined by the General Motors Company LLC, Detroit Mich.

A vehicle communication link within a vehicle can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle. The computing system 2 or another computing system can include a transceiver connectable to a vehicle communication link and a processor to transmit and receive vehicle communications via the vehicle communication link.

As indicated above, any vehicle described herein can include an electronic control unit (ECU), a data link connector (DLC), and a vehicle communication link that connects the DLC to the ECU. An ECU can control various aspects of vehicle operation or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. Performance of a functional test can or a reset procedure with respect to an ECU can comprise the computing system 2 transmitting a VDM to a vehicle. A VDM received by an ECU can comprise a PID request. A VDM transmitted by an ECU can comprise a response comprising the PID and a PID data value for the PID.

The DLC can include an on-board diagnostic (OBD) II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Delphi Automotive LLP of Troy, Mich. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication link such that the DLC is communicatively connected to the ECU.

The computing system 2 and/or the vehicle 8 can be located at the same location as one another or remotely from one another at separate, distinct locations. For example, both the computing system 2 and the vehicle 8 can be located at a repair shop. As another example, both the computing system 2 and the vehicle 8 can be located out on the road. As yet another example, the computing system 2 can be located at a repair shop and the vehicle 8 can be located out on the road. One or more of these locations can also include various computerized shop tools (CSTs) and/or non-computerized shop tools, such as a battery charger, torque wrench, brake lathe, fuel pressure gauge, wheel balancer, etc. Further, one or more of the shop tools and/or the computing system 2 can be operable outside of a repair shop. For example, the computing system 2 can be operable within the vehicle 8 as the vehicle 8 is driven on roads outside of the repair shop for any of a variety of purposes.

The vehicle 8 can transmit various data to the computing system 2, such as OBD data (e.g., diagnostic trouble codes (DTCs), measurements read by a shop tool from a VDM, real-time and/or non-real-time electrical measurements (e.g., sensor readings), and/or other types of data. For example, the vehicle 8 can transmit data directly to the computing system 2 over communication link 11. As another example, the vehicle 8 can transmit data indirectly to the computing system 2 by transmitting the data over communication link 12, communication network 6, and communication link 10 to the server 4, after which the server 4 can transmit the data over communication link 10, communication network 6, and communication link 9 to the computing system 2. The vehicle 8 can perform such an indirect transmission of data with or without specifying the computing system 2 as a destination for the data. For instance, the vehicle 8 (and perhaps other vehicles in communication with the server 4) can transmit data to the server 4, specifying only the server 4 as the destination for the data. Thereafter, the computing system 2 can transmit to the server 4 a request for the data, the server 4 can assemble the data and transmit the data to the computing system 2 in response to the request.

The computing system 2, the server 4, and/or the vehicle 8 can transmit data to (and receive data from) other devices on the communication network 6 as well, such as one or more databases (not shown) to which the computing system 2, the server 4, and/or the vehicle 8 have access.

For any given computer device discussed herein, such as the computing system 2, the server 4, and/or the vehicle 8, data received by that device can be stored within a computer-readable medium for use by that device. Further, for any given computer device discussed herein, such as the computing system 2, the server 4, and/or the vehicle 8, data received by that device can be stored locally in memory at that device and/or can be stored remotely at a storage location accessible by that device (e.g., a remote server or remote database).

One or more computing systems and/or one or more vehicles can be connected by a network established by those devices, such as a vehicle-to-client network, or the like. Such a network can comprise a personal area network (PAN). The PAN can be configured according to any of a variety of standards, protocols, and/or specifications. For example, the PAN can be configured according to a universal serial bus (USB) specification 2.0, 3.0, or 3.1 developed by the USB Implementers Forum. As another example, the PAN can be configured according to an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15.3, 802.15.4, or 802.15.5) for wireless PAN.

In example operating environment 1, there can be a scenario in which the computing system 2 transmits to the server 4 a request for a download of information (e.g., information associated with a vehicle component for a particular vehicle). Such a request can include, for example, a YMM of a particular vehicle and a name of a particular vehicle component. As another example, the request can include a YMME of a particular vehicle and an indication (e.g., a description or code) of a particular symptom associated with a particular vehicle component. As yet another example, the request can include data received from the vehicle for which the information is being requested, and such data can include a vehicle identification number (VIN) of the vehicle, a DTC indicative of a particular vehicle component of the vehicle, an image of a particular vehicle component, among other possibilities.

In this scenario, upon receipt of the request, the server 4 can assemble the download. For instance, upon receipt of the request, the server 4 can retrieve some or all of the computing system-requested information from memory at the server 4. Additionally or alternatively, upon receipt of the request, the server 4 can in turn transmit to one or more databases located remotely from the server 4 a request for some or all of the computing system-requested information and then receive some or all of the computing system-requested information from the one or more databases. Upon assembling the download including the computing system-requested information, the server 4 can transmit the download to the computing system 2.

Figure 2:
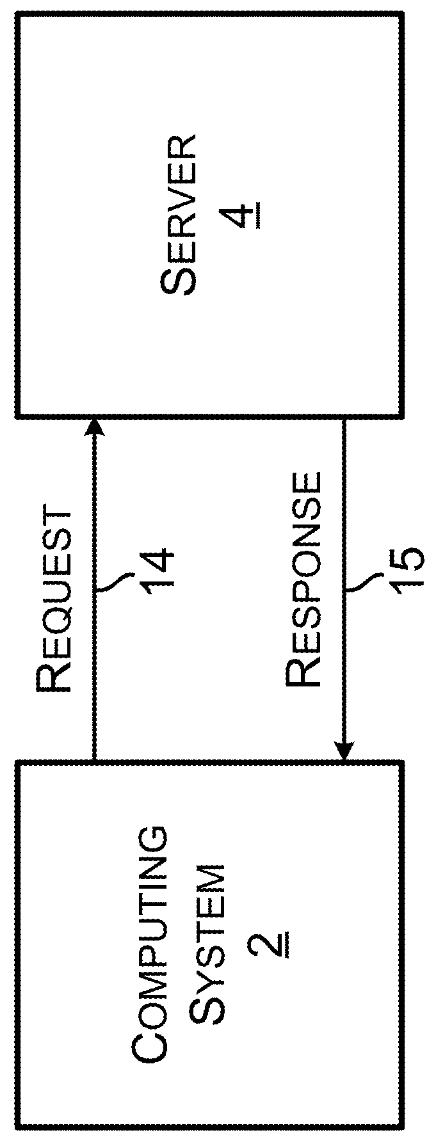
FIG. 2 is a communication flow diagram.

Next, FIG. 2 illustrates an example workflow between a computing system and a server. More specifically, the computing system 2 may communicate with the server 4 to assist a technician with the servicing of the vehicle 8. For instance, the computing system 2 may send a request 14 over a communication network (e.g., the communication network 6) to the server 4. The request 14 may include information describing the vehicle 8 and related to operation of the vehicle 8 (e.g., symptoms). Upon receiving the request 14, the server 4 may transmit a response 15 to the request 14 back to the computing system 2. The response may include various information that the computing system 2 may utilize. For example, the server 4 may transmit a threshold, multiple thresholds, or other information related to one or more PIDs that correspond to the vehicle 8. As such, the response 15 to the request 14 provided by the server 4 may allow the computing system 2 to display contextually relevant pieces of data or information about the vehicle 8, such as vehicle data parameter (VDP) graphs indicative of various PIDs or a test to perform to service a vehicle with respect to a PID that breached a PID threshold.

Figure 3:
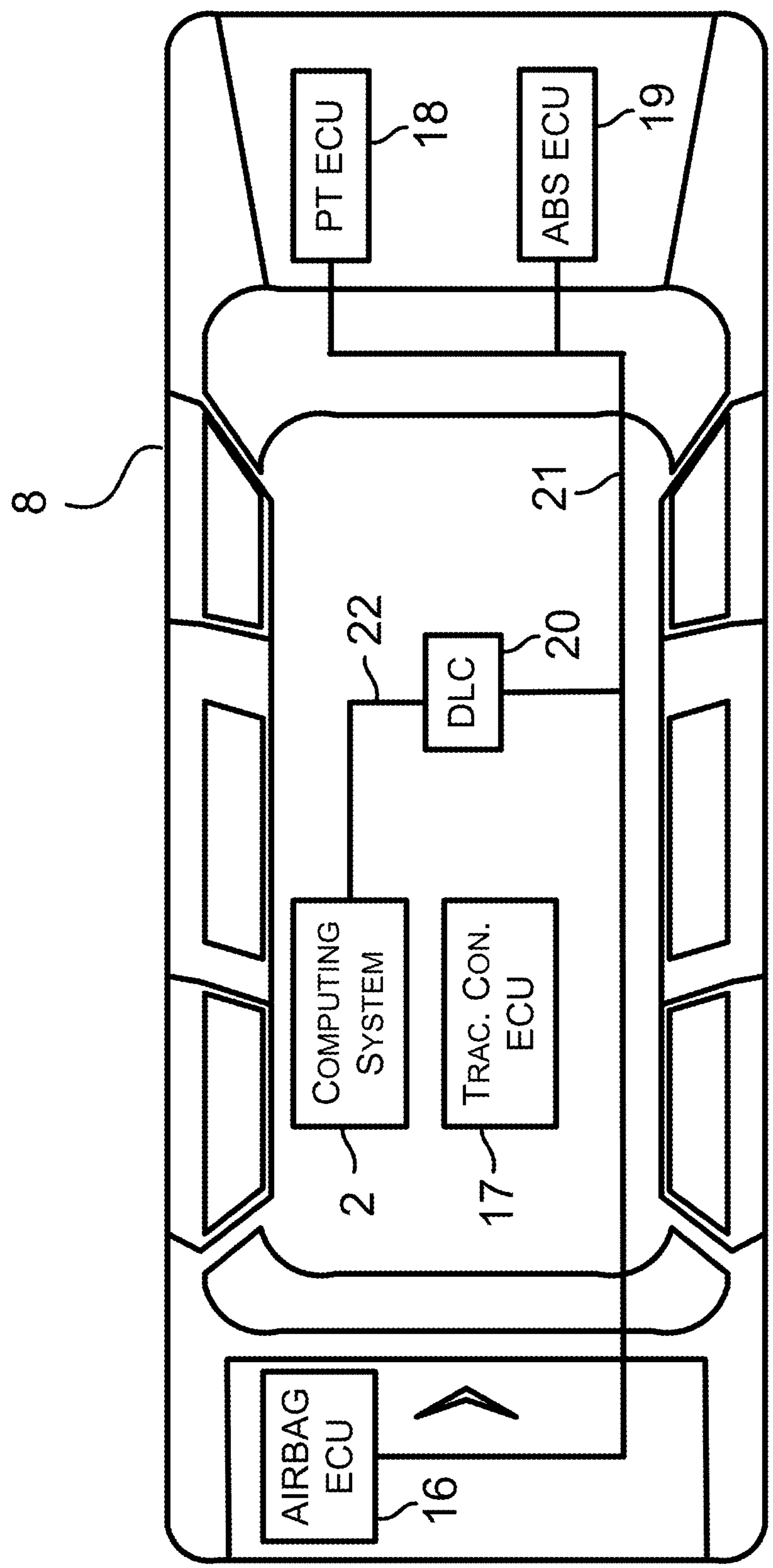
FIG. 3 is a diagram of a vehicle showing example placement of a computing system.

Next, FIG. 3 shows example details of the vehicle 8 and example placement of the computing system 2 within the vehicle 8. Particularly, the vehicle 8 is shown with an airbag system ECU 16, a traction control system ECU 17, a powertrain system ECU 18, an anti-lock brake system (ABS) ECU 19, and a DLC 20, each of which is connected to a vehicle communication link 21. Other examples of the ECU within the vehicle 8 are also possible.

The DLC 20 can have various positions within the vehicle 8. For example, the DLC 20 can be located within a passenger compartment of the vehicle 8, within an engine compartment of the vehicle 8, or within a storage compartment within the vehicle 8. Particularly, the computing system 2 can include and/or connect to the DLC 20 via a DLC-to-display-device communication link 22. As such, the computing system 2 can be removed after the vehicle 8 has been serviced at a repair shop. In that way, the computing system 2 can be used to diagnose other vehicles, such as vehicle that subsequently arrive at a repair shop. As discussed above, the DLC 20 can comprise a connector such as an OBD I connector, an OBD II connector, or some other connector. Particularly, the DLC 20 can include one or more conductor terminals that connect to a conductor of the vehicle communication link such that the DLC 20 is communicatively connected to the ECU within the vehicle 8.

Figure 4:
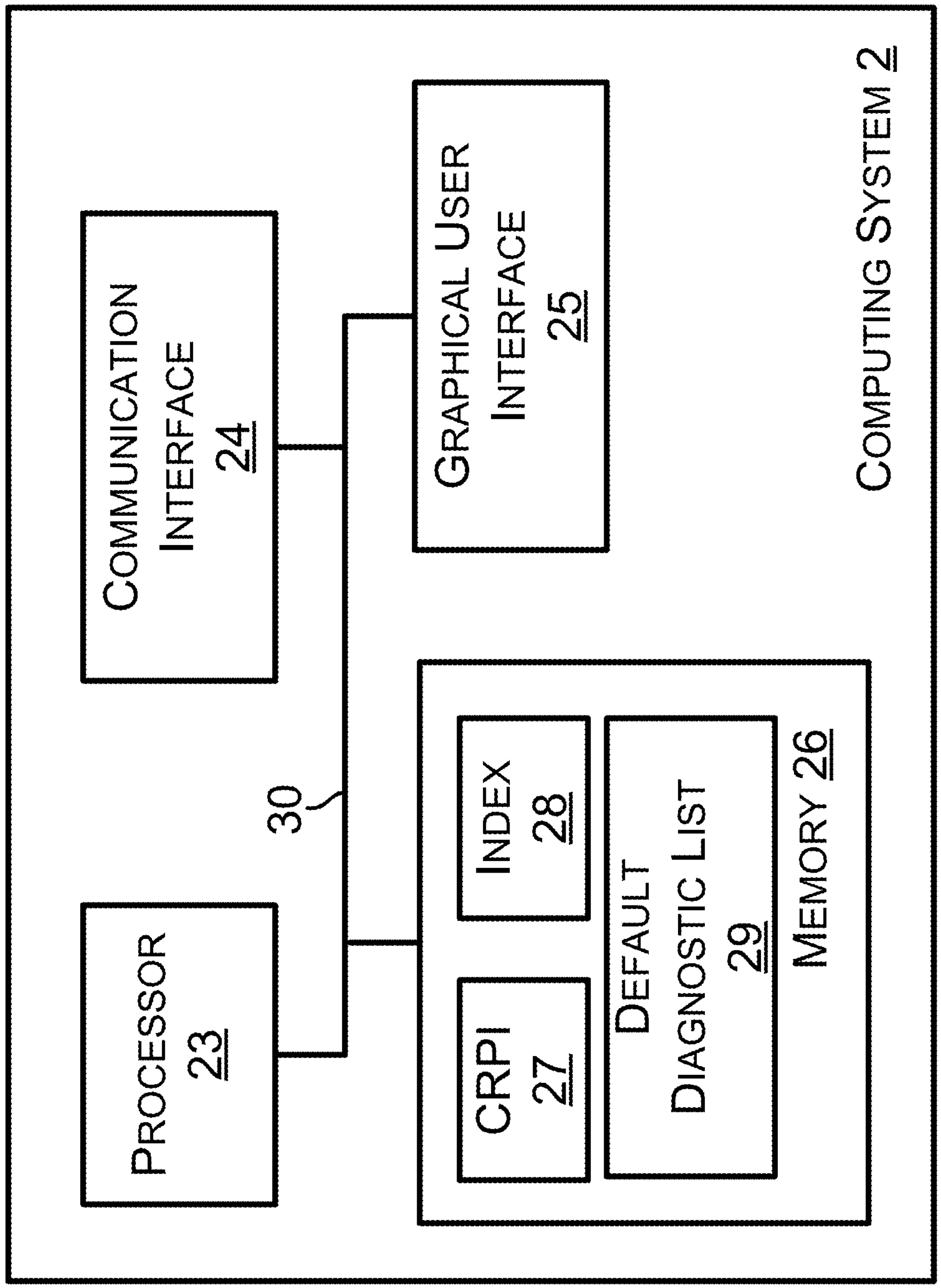
FIG. 4 is a block diagram of an example computing system.

FIG. 4 is a block diagram of the computing system 2. As indicated above, in some examples, the computing system 2 may operate as a vehicle diagnostic tool, scanner, or other type of VST. In other examples, the computing system 2 may be a tablet computing device, a cellular phone, a laptop or desktop computer, a head-mountable device (HMD), a wearable computing device, or a different type of fixed or mobile computing device. The configuration and type of computing system can vary within examples.

As shown in FIG. 4, the computing system 2 includes a processor 23, a communication interface 24, a graphical user interface 25, and memory 26. Two or more of these components as well as other potential components can be communicatively coupled or linked together via a system bus, network, or other connection mechanism 30. The computing system 2 can include more or fewer components within other examples.

The processor 23 can comprise one or more processors, such as one or more general purpose processors (e.g., an INTEL® single core microprocessor or an INTEL® multicore microprocessor), or one or more special purpose processors (e.g., a digital signal processor, a graphics processor, or an application specific integrated circuit (ASIC) processor). As such, the processor 23 can be configured to execute computer-readable program instructions (CRPI) 27 store in the memory 26. The processor 23 can also be configured to execute hard-coded functionality in addition to or as an alternative to software-coded functionality (e.g., via CRPI 27). Within example implementations, the processor 23 can be programmed to perform any function or combination of functions described herein as being performed by the computing system 2.

The communication interface 24 of the computing system 2 can include one or more communication interfaces. Each communication interface can include one or more transmitters configured to transmit data onto a network, such as the communication network 6. As such, the data transmitted by the communication interface 24 can comprise any data described herein as being transmitted, output, and/or provided by the computing system 2. Moreover, each communication interface can include one or more receivers configured to receive data carried over a network, such as the communication network 6. The data received by the communication interface 24 can comprise any data described herein as being received by the computing system 2, such as vehicle identifying information or a DTC.

The graphical user interface 25 can include one or more display interfaces and other potential elements configurable to display information to a user. For instance, the graphical user interface 25 can represent a type of user interface that allows users to interact with the computing system 2 through graphical icons and visual indicators. Various example graphical user interfaces are described below with regards to FIG. 5.

The memory 26 can include one or more types of memories. A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For instance, the memory 26 can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

The memory 26 stores computer-readable data, such as the CRPI 27, an index 28, and a default diagnostic list 29. The CRPI 27 can comprise a plurality of program instructions and can also include data structures, objects, programs, routines, or other program modules that can be accessed by a processor and executed by the processor to perform a particular function or group of functions and are examples of program codes for implementing steps for methods described in this description. In general, the CRPI 27 can include program instructions to cause the computing system 2 to perform any function described herein as being performed by the computing system 2 or to cause any component of the computing system 2 to perform any function herein as being performed by that component of the computing system 2. As an example, the CRPI 27 can include program instructions to perform the sets of functions 180 described herein or similar functions.

The index 28 may include a listing of PIDs, component tests, functional tests, and/or reset procedures, among other possible information. In some examples, the index 28 may also include additional associated information. For example, as part of a PID index (e.g., PID index 60 described in FIG. 7), PID descriptors may also be stored for display by the computing system 2. As a further example, information indicating how to communicate a request for each PID value to the vehicle 8 may also be stored as part of a PID index.

The default diagnostic list 29 may indicate particular PIDs, functional tests, component tests, and/or reset procedures to display for a given symptom or set of symptoms for the vehicle 8. In other examples, the default diagnostic list 29 may indicate which PIDs, functional tests, component tests, and/or reset procedures to display for any symptom when a symptom-based filter list is unavailable from the server 4.

Figure 5:
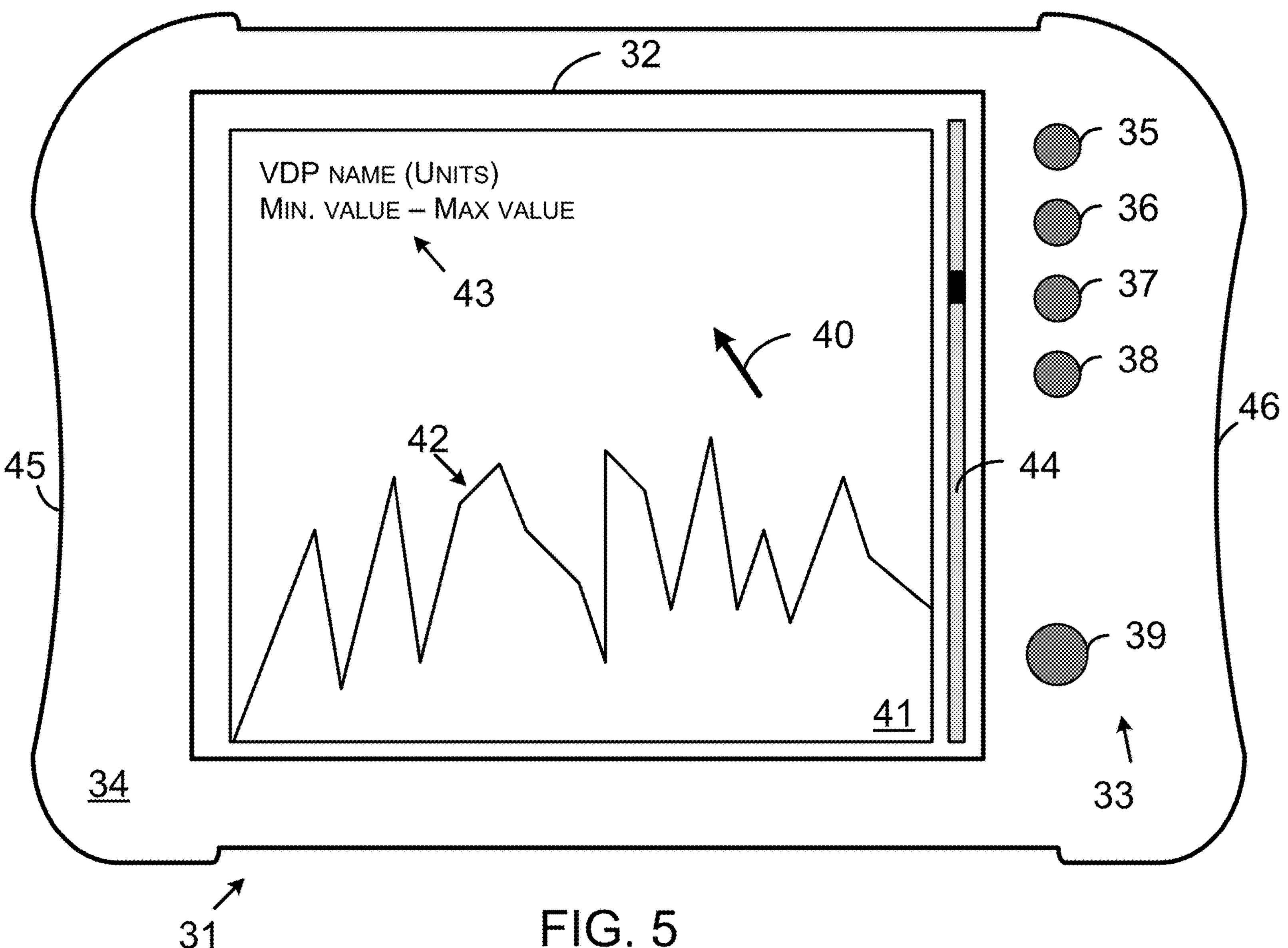
FIG. 5 is a diagram of an example VST with a display in accordance with the example embodiments.

Next, FIG. 5 is an illustration of an example vehicle service tool in accordance with the example embodiments. The VST 31 can operate utilizing the computing system 2 shown in FIG. 3 or utilizing another computing system. As such, the VST 31 includes a display 32, a user input section 33, and a housing 34 with the display 32 and the user input section 33 making up a part of a user interface configured to receive input from a user and provide output to the user of the VST 31.

In some examples, the display 32 of the VST 31 can include a touch-screen display, such as a color touch screen used on the MODIS™ ultra integrated diagnostic system (reference number EEMS328 W) available from Snap-on Incorporated of Kenosha, Wis. or another type of touch-screen interface. In other examples, the display 32 can include a backlit color liquid crystal display (LCD) having a resistive touch screen or panel or a plasma display or a light emitting diode (LED) display. In further examples, the display 32 can include a display like those used as part of a tablet device (such as an IPAD® tablet device from Apple Inc., or a SAMSUNG GALAXY TAB tablet device from Samsung Electronics Co., Ltd.). As another example, the display 32 can include a display like displays used on a smartphone (such as an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea). Other examples of the display 32 on the VST 31 are also possible.

As shown in FIG. 5, the display 32 can have a rectangular-like shape, such as a rectangle with square corners or a generally rectangular shape with rounded corners, but the display 302 is not limited to such shapes. For instance, the display 32 can have a circular or triangular shape within other examples. Further, in other examples, the VST 31 may include multiple displays (e.g., a front display and a back display).

The VST 31 further includes the user input section 33, which can include various types of input mechanisms for enabling a user to communicate with the VST 31. For instance, as shown in FIG. 5, the user input section 33 can include one or more input selectors, such as input keys 35, 36, 37, 38, and 39. The user input keys can be arranged in any of a variety of configurations. For instance, input key 35 can represent an up-direction selection, input key 36 can represent a right-direction selection, input key 37 can represent a down-direction selection, input key 38 can represent a left-direction selection, and input key 39 can represent an enter selection. Pressing one of the input keys can cause a display pointer 40 to move in a direction represented by the input key being pressed. Pressing the input key 39 can cause selection of a displayed data element to which the display pointer 40 is pointing. In other examples, the user input section 33 may include input controls arranged in other configurations, such as joysticks, touchpads, or other button layouts (e.g., a directional pad). In further examples, the VST 31 may include other components for receiving input from a user, such as a microphone to receive verbal commands or a camera for detecting motions of the user.

The processor 23 shown in the computing system 2 in FIG. 4 can execute program instructions of the CRPI 27 to cause the display 32 of the VST 31 to display one or more vehicle data parameter (VDP) graph windows or other information. A VDP graph window can represent information corresponding to one or more PIDs obtained from the vehicle 8. For instance, the VDP graph window can include a VDP line graph that represents parameters relating to a particular PID. The display 32 can display one or more VDP graphs using different size windows that are adjustable by a user. For instance, as shown in FIG. 5, the VST 31 can cause the display 32 to display VDP graph 41 shown in a rectangular window. In other examples, the display 32 can display vehicle parameters as digital values. Other examples are also possible.

The VDP graph 41 can include various elements, such as VDP line graph 42 representing parameters corresponding to a PID. The VDP graph 41 can also show graph text 43, which may include information such as a name of a parameter represented by the line graph 42, a units identifier identifying the units of the VDP line graph 42 (e.g., volts, percent, or counts), and threshold ranges (e.g., minimum and maximum thresholds associated with a particular PID). In some instances, the minimum and maximum ranges can be restricted to the minimum and maximum values of the VDP line graph 42 currently displayed within the VDP graph 41. For instance, memory 26 can store minimum and maximum values for one or more vehicle parameters and use those stored minimum and maximum values to populate the graph text 43 when a parameter associated with minimum and maximum values is displayed by the display 32 on the VST 31.

The processor 23 can execute program instructions of the CRPI 27 to cause the display 32 to display one or more scroll bars, such as the scroll bar 44. The scroll bar 44 can be used to scroll through multiple graphs of parameters corresponding to various PIDs or other information displayable on the display 32. In further examples, the processor 23 can execute program instructions of the CRPI 27 to cause the display 32 to display a graph view slider that is configurable to modify a view of the graph of parameters corresponding to a given PID on the display 32.

The housing 34 can provide support or protection of components of the VST 31. As such, in some examples, the housing 34 can include hand grips 45, 46 to enable a user to hold the VST 31. The housing 34 can include one or more port openings (not shown) for connecting one or more communication links, such as the communication interface 24. In other examples, the housing 34 can have other configurations.

Figure 6:
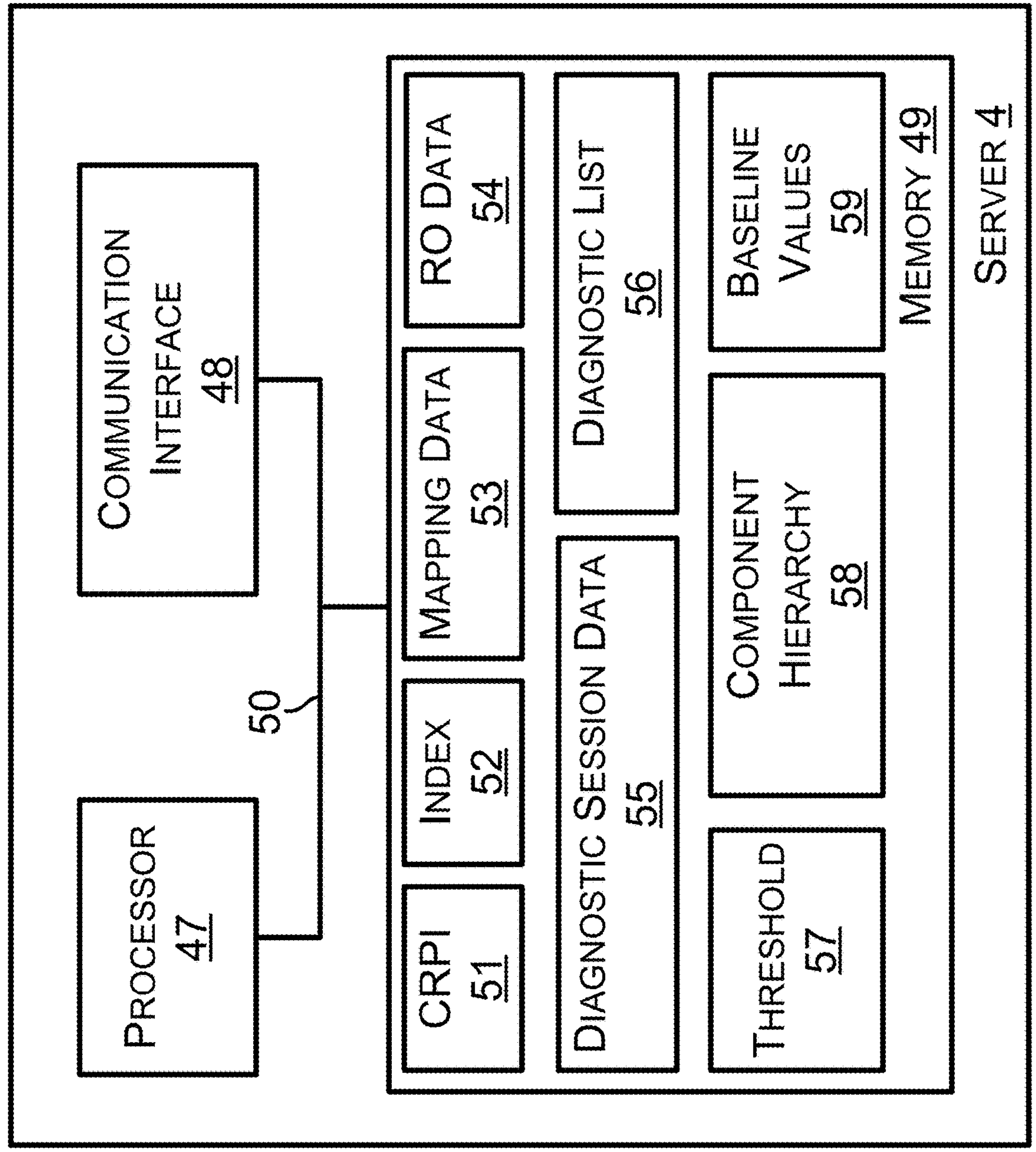
FIG. 6 is a block diagram of an example server.

Next, FIG. 6 is a block diagram of the server 4. Particularly, the server 4 comprises a processor 47, a communication interface 48, and a memory 49. Two or more of those components can be communicatively coupled or linked together via a system bus, network, or other connection mechanism 50. In other examples, the server 4 can include more or fewer components.

The processor 47 can be configured to execute computer-readable program instructions (CRPI), such as CRPI 51 stored in the memory 49. The processor 47 can be configured to execute hard-coded functionality in addition to or as an alternative to software-coded functionality (e.g., via CRPI 51), and can be programmed to perform any function or combination of functions described herein as being performed by the server 4.

The memory 49 stores computer-readable data, such as the CRPI 51, an index 52, mapping data 53, repair order (RO) data 54, diagnostic session data (DSD) 55, a diagnostic list 56, a threshold 57, component hierarchy 58, and baseline values 59. The RO data 54 can comprise data from one or more repair orders. The data from each RO can be stored within the RO data 54 as a separate record pertaining to a vehicle of the set of vehicles being worked on at a repair shop. The RO data 54 can comprise RO data aggregated from multiple ROs. The threshold 57 can comprise any threshold value and/or threshold percentage discussed in this description.

The DSD 55 can comprise data the server 4 can use to determine an operating state of the computing system 2. The data the server 4 uses to determine an operating state of the computing system 2 can include vehicle identifying information, data indicating an elapsed time since the server 4 last received a communication from the computing system 2, data indicating the most recent type of diagnostic list requested by and/or transmitted to the computing system 2, and/or data indicating a repair has been made to the particular vehicle.

The DSD 55 can comprise data indicative of the determined operating state of the computing system 2. Examples of the operating state include (i) the computing system 2 is connected to the server 4, (ii) the computing system 2 is not connected to the server 4 (i.e., disconnected from the server 4), (iii) the computing system 2 is connected to a particular vehicle (e.g., the vehicle 8), (iv) the computing system 2 is no longer connected to the particular vehicle (i.e., disconnected from the particular vehicle), (v) the computing system 2 is in a request and/or display diagnostic list mode for the particular vehicle, (vi) the computing system 2 has exited the request and/or display diagnostic list mode for the particular vehicle, and (vii) the computing system 2 has returned to the request and/or display diagnostic list mode for the particular vehicle.

The DSD 55 can also comprise data indicating a diagnostic session at the computing system 2 is active or inactive. The server 4 can determine a new diagnostic session is active upon receiving vehicle identifying information for a particular vehicle while the DSD 55 does not include data indicating a diagnostic session is active for the particular vehicle. The server 4 can determine an active diagnostic session for a particular vehicle has transitioned to inactive upon receiving vehicle identifying information for a different particular vehicle. The server 4 can determine an active diagnostic session for a particular vehicle has transitioned to an inactive session upon determining a threshold amount of time has elapsed since a particular activity of the active diagnostic session. As an example, the particular activity can comprise receiving a request from the computing system 2, receiving a communication indicating the computing system 2 is connected to the communication network 6 and/or transmitting a response with a diagnostic list 56 to the computing system 2. Other examples of the particular activity are also possible.

The threshold 57 can comprise thresholds for PIDs. The thresholds for each PID can comprise a maximum data value and a minimum data value. The threshold 57 can comprise one or more thresholds for PIDs from each set of vehicles identifiable by some particular vehicle identifying information. In this way, the server 4 can provide the computing system 2 with applicable thresholds with respect to a particular vehicle connected to the computing system 2.

In one respect, the threshold 57 can comprise thresholds defined by a vehicle manufacturer. For a particular PID associated with a DTC, the vehicle manufacturer may define the maximum data value as the greatest data value for the particular PID an ECU would output while the associated DTC is set to inactive, and the vehicle manufacturer may define the minimum data value as the lowest data value for the particular PID the ECU would output while the associated DTC is set to inactive. In another respect, the threshold 57 can comprise thresholds determined by the server 4 from PID data values received within communications that include PID data values. The server 4 can store the received PID data values within the threshold 57 and determine the maximum and minimum data values for each PID for each set of vehicles identifiable by particular vehicle identifying information.

The server 4 can maintain a PID count that indicates how many PID data values have been received and/or stored for a particular PID. The server 4 can compare the PID count to a first threshold PID count value stored in the threshold 57. If the server 4 determines that the PID count is less than the first threshold PID count value, the server 4 can produce a first threshold for the particular PID. As an example, the server 4 can determine the first threshold for the PID to be a mean maximum PID data value plus X standard deviations of the mean maximum PID data value and a mean minimum PID data value minus X standard deviations of the mean minimum PID data value. The mean maximum PID data value is the mean of maximum PID data values for the particular PID across vehicles identifiable by the particular vehicle identifying information with all DTC from the ECU that provides the particular PID set to inactive. The mean minimum PID data value is the mean of minimum PID data values for the particular PID across vehicles identifiable by the particular vehicle identifying information with all DTC from the ECU that provides the particular PID set to inactive.

As the server 4 continues to receive PID data values for the particular PID, the server 4 can determine the quantity of received PID data values for the particular PID exceeds the first threshold PID count value, but is less than a second threshold PID count value. In this situation, the server 4 can produce a second threshold for the particular PID. As an example, the server 4 can determine the second threshold for the PID to be a mean maximum PID data value plus X-1 standard deviations of the mean maximum PID data value and a mean minimum PID data value minus X-1 standard deviations of the mean minimum PID data value. The first threshold can be referred to a loose threshold with respect to the second threshold. The second threshold can be referred to as a tighter threshold with respect to the first threshold.

The server 4 can determine loose and tight thresholds in other manners. For example, before the server 4 has received a number of PID data values for the particular PID that exceeds the first threshold PID count value, the server 4 can add a first percentage of the mean maximum PID data value for the particular PID to that mean maximum PID data value or a first percentage of the maximum PID data value for the particular PID to that maximum PID data value. Furthermore, before the server 4 has received a number of PID data values for the particular PID that exceeds the first threshold PID count value, the server 4 can subtract a first percentage of the mean minimum PID data value for the particular PID from that mean minimum PID data value or a first percentage of the minimum PID data value for the particular PID from that minimum PID data value.

As the server 4 continues to receive PID data values for the particular PID, the server 4 can determine the quantity of received PID data values for the particular PID exceeds the first threshold PID count value, but is less than a second threshold PID count value. In this situation, the server 4 can add a second percentage of a mean maximum PID data value for the particular PID to that mean maximum PID data value or a second percentage of a maximum PID data value for the particular PID to that maximum PID data value, and the server 4 can subtract a second percentage of a mean minimum PID data value for the particular PID from that mean minimum PID data value or a second percentage of a minimum PID data value for the particular PID from that minimum PID data value. The second percentage can be smaller than the first percentage so that the thresholds determined using the second percentage is typically a tighter threshold range as compared to the thresholds determined using the first percentage.

The server 4 can provide the computing system 2 with a threshold or multiple thresholds for the particular PID without any tolerance values so that the computing system 2 does not need to calculate a threshold or thresholds to be displayed on a graphical interface of the computing system 2. Alternatively, the server 4 can provide the computing system 2 with a threshold or multiple thresholds for the particular PID with at least one tolerance value. The at least one tolerance value could, for example, be the first percentage or second percentage discussed above, or a value of the X standard deviations or the X-1 standard deviations. Other examples of the at least one tolerance value are also possible.

The CRPI 51 can comprise a plurality of program instructions. The CRPI 51 and any other CRPI described in this description can include data structures, objects, programs, routines, or other program modules that can be accessed by a processor and executed by the processor to perform a particular function or group of functions and are examples of program codes for implementing steps for methods described in this description. In general, the CRPI 51 can include program instructions to cause the server 4 to perform any function described herein as being performed by the server 4 or to cause any component of the server 4 to perform any function herein as being performed by that component of the server 4.

As another example, the CRPI 51 can include program instructions to perform session management with respect to the computing system 2. The processor 47 can use the DSD 55 to determine the operating state of the computing system 2. Upon and/or in response to determining the computing system 2 is in the request and/or display diagnostic list mode for the particular vehicle, the processor 47 can determine the requested diagnostic list and provide the computing system 2 with a response including the requested diagnostic list.

Upon and/or in response to determining the computing system 2 has exited the request and/or display diagnostic list mode for the particular vehicle and that a repair has been made to the particular vehicle, the processor 47 can provide a session-change response to the computing system 2 to direct the computing system 2 to display a previously-displayed diagnostic list or a different diagnostic list. The session-change response can include the previously-displayed diagnostic list or the different diagnostic list.

Upon and/or in response to determining the computing system 2 has returned to the request and/or display diagnostic list mode for the particular vehicle, the processor 47 can provide a session-change response to the display device 4 to direct the computing system 2 to display a previously-displayed diagnostic list or a different diagnostic list.

A communication interface such as the communication interface 48 or any other communication interface discussed in this description can include one or more communication interfaces. Each communication interface can include one or more transmitters configured to transmit data onto a network, such as the communication network 6. The data transmitted by the communication interface 48 can comprise any data described herein as being transmitted, output, and/or provided by the server 4. Moreover, each communication interface can include one or more receivers configured to receive data carried over a network, such as the communication network 6. The data received by the communication interface 48 can comprise any data described herein as being received by the server, such as repair order data and any request described herein.

A transmitter can transmit radio signals carrying data and a receiver can receive radio signals carrying data. A communication interface with that transmitter and receiver can include one or more antennas and can be referred to as a "radio communication interface," an "RF communication interface," or a "wireless communication interface." The radio signals transmitted or received by a radio communication interface can be arranged in accordance with one or more wireless communication standards or protocols such as an IEEE 802.15.1 standard for WPANs, a Bluetooth version 4.1 standard developed by the Bluetooth Special Interest Group (SIG) of Kirkland, Wash., or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the communication network 6. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a communication interface can include a destination identifier or address of a network device to which the data is to be transmitted. The data transmitted by a communication interface can include a source identifier or address of the system component including the communication interface. The source identifier or address can be used to send a response to the network device that includes the communication interface that sent the data.

A communication interface that is configured to carry out communications over the communication network 6, such as the communication interface 48, can include a modem, a network interface card, and/or a chip mountable on a circuit board. As an example the chip can comprise a CC3100 Wi-Fi® network processor available from Texas Instruments, Dallas, Tex., a CC256MODx Bluetooth® Host Controller Interface (HCI) module available from Texas instruments, and/or a different chip for communicating via Wi-Fi®, Bluetooth® or another communication protocol.

Next, FIG. 7 shows an example PID index 60, which comprises an ordered list of PIDs. Particularly, three example representations of PIDs are shown within the PID index 60, which represents the PIDs using PID numbers 61, index values 62, and PID names 63 (i.e., at least one word describing a PID). A different PID index (for use with the example embodiments) may represent PIDs using only one of those three example representations, a combination of any two of those three example representations, or with a different example PID representation. The VST 31 may use PID index 60 to display parameters related to a set of associated PIDs on the display 32.

The index values 62 can, for example, comprise decimal, hexadecimal, or numbers of some other base to represent the PIDs within the PID index 60. Other example PID indexes may comprise multiple PID indices, such as a separate PID index for each of multiple different set of particular identifying information (e.g., a separate PID index for each Y/M/M or Y/M/M/E). As such, the separate PID index can be arranged like the PID index 60 or in another manner. The PID index 60 can comprise or be associated with particular vehicle identifying information.

Next, FIG. 8 shows an example component test index (CTI) 64, which comprises an ordered list of component tests. The example CTI 64 includes three example representations of component tests, which can represent various component tests that the VST 31 may be configured to perform. For instance, the VST 31 may perform a given component test in response to an initial selection of an indicator displayed on a VDP graph and a subsequent selection of the component test.

The CTI 64 is shown having component test numbers 65, index values 66, and component test names 67 (i.e., at least one word describing a component test). A different CTI (for use with the example embodiments) may represent component tests using only one of those three example representations, a combination of any two of those three example representations, or with a different example component test representation. The index values 66 can, for example, comprise decimal, hexadecimal, or numbers of some other base to represent the component tests within the CTI 64.

Other example CTIs can comprise multiple component test indices, such as a separate CTI for each of multiple different set of particular identifying information (e.g., a separate CTI for each Y/M/M or Y/M/M/E). The separate CTI can be arranged like the CTI 64 or in another manner.

The CTI 64 can comprise or be associated with particular vehicle identifying information.

Next, FIG. 9 shows an example functional test index (FTI) 68. The FTI 68 comprises an ordered list of functional tests, and shows three example representations of functional tests using functional test numbers 69, index values 70, and functional test names 71 (i.e., at least one word describing a functional test). A different FTI (for use with the example embodiments) may represent functional tests using only one of those three example representations, a combination of any two of those three example representations, or with a different example functional test representation.

The index values 70 can, for example, comprise decimal, hexadecimal, or numbers of some other base to represent the functional tests within the FTI 68. Other example FTI can comprise multiple functional test indices, such as a separate FTI for each of multiple different set of particular identifying information (e.g., a separate FTI for each Y/M/M or Y/M/M/E). The FTI 68 can comprise or be associated with particular vehicle identifying information.

Next, FIG. 10 shows an example reset procedure index (RPI) 72, which comprises an ordered list of reset procedures. FIG. 10 shows three example representations of reset procedures within the RPI 72. As shown in FIG. 10, the RPI 72 can represent reset procedures using reset procedures numbers 73, index values 74, and reset procedures names 75 (i.e., at least one word describing a reset procedure). A different RPI (for use with the example embodiments) may represent reset procedures using only one of those three example representations, a combination of any two of those three example representations, or with a different example reset procedure representation. In some instances, the VST 31 may provide an option for a user to select to perform a reset procedure.

The index values 74 can, for example, comprise decimal, hexadecimal, or numbers of some other base to represent the reset procedures within the RPI 72. Other example RPIs can comprise multiple reset procedure indices, such as a separate RPI for each of multiple different set of particular identifying information (e.g., a separate RPI for each Y/M/M or Y/M/M/E). The separate RPI can be arranged like the RPI 72 or in another manner. The RPI 72 can comprise or be associated with particular vehicle identifying information. The index values 74 can be different than the index values of other indices (such as the PID index 60, the CTI 64, and the FTI 68) so that a single index using the index numbers of multiple indices can be formed without any overlap of the index numbers.

IV. Example Display Presentations

Figure 11:
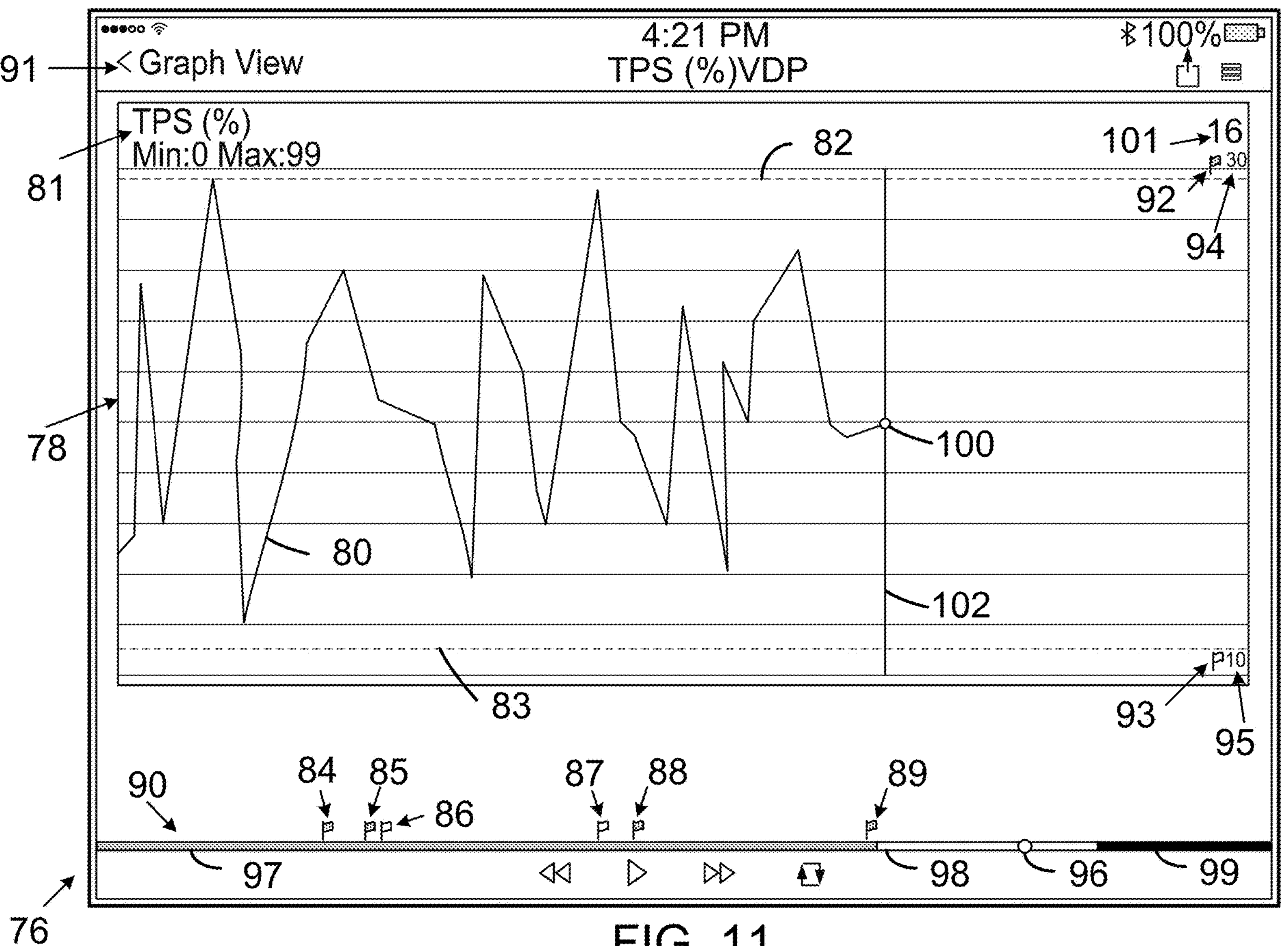
FIG. 11 is a diagram depicting an example display presentation.

Next, FIG. 11 is a diagram depicting an example display presentation (DP) 76 that the VST 31 can display on the display 32. The DP 76 is shown in a landscape orientation, but can have a vertical orientation in other examples. As such, the DP 76 includes a VDP graph window 78 with a VDP line graph 80, VDP graph text 81, and VDP threshold indicators 82, 83 placed on the VDP line graph 80. The DP 76 also displays vehicle operating condition indicators 84, 85, 86, 87, 88, and 89 along with a time-based indicator 90, and further includes a view selector 91 for selecting different views for a set of VDP, at least one of which can include a currently displayed VDP. Besides the graph view depicted in FIG. 11, other views can include, but are not limited to, a digital view and a list view.

The VDP line graph 80 is an example of a line graph in which the area below the line graph is not shaded. The VDP line graph 80 can represent parameters related to a particular PID, such as a first PID that is part of a set of associated PIDs. The VDP line graph 80 can include or be displayed with other information related to operation of the vehicle 8. That other information can comprise VDP graph text 81, for example. In general, the VDP graph text 81 can include graph text pertaining to any VDP associated with or from the vehicle 8. As an example, the VDP graph text 81 can comprise text indicative of a threshold that pertains to a particular vehicle component (e.g., a throttle position sensor (TPS) position) or a PID associated with that vehicle component. The threshold can specify its units, such as a percentage, volts or amperes.

The VDP threshold indicator 82 shown positioned above the VDP line graph 80 in the VDP graph window 78 may represent an upper VDP threshold associated with a TPS position percentage shown in the VDP graph text 81. Similarly, the VDP threshold indicator 83 may represent a lower VDP threshold associated with a TPS position percentage. In some example implementations, the VDP threshold indicators 82 and 83 can include visual indicators (e.g., horizontal lines) indicative of the thresholds. A VDP indicator, such as VDP threshold indicator 82 or 83, can also include a vehicle operating condition (VOC) indicator. A VOC indicator can have unique characteristics to distinguish it from a different type of VOC indicator. In addition, the VDP graph window 78 includes an upper threshold indicator 94 that indicates a numeric value of the upper threshold of the VDP displayed in the VDP graph window 78. The VDP graph window 78 includes a lower threshold indicator 95 that indicates a numeric value of the lower threshold of the VDP displayed in the VDP graph window 78.

As further shown in FIG. 11, the VOC indicator of the VDP threshold indicator 82 includes a dark-colored flag icon 92, whereas the VOC indicator of the VDP threshold indicator 83 includes a light-colored flag icon 93. The different colored flag icons 92, 93 are further discussed in FIG. 13.

The time-based indicator 90 depicted in the DP 76 can represent various time segments on a display of the VST 31. In other examples, the time-based indicator 90 can have other positions or configurations. As shown, the time-based indicator 90 can include a cursor positioner 96 and time segments 97, 98, and 99 to convey time information to a user of the VST 31. The cursor positioner 96 can correspond to a cursor 100 positioned in the VDP graph window 78 and may also correspond to a digital VDP value 101 that indicates a current value of the VDP at the cursor 100. The DP 76 shows the time-based indicator near a bottom of the DP 76. The time-based indicator 90 could be displayed at other locations within a DP.

The time segment 97 provides an indication of an amount time or percentage that frames or data values for the displayed VDP were captured prior to the frames or data values of the VDP currently displayed within the VDP graph window 78, relative to the time segments 98 and 99. The time segment 98 provides an indication of an amount of time or percentage represented by the VDP values displayed within the VDP graph window 78, relative to the time segments 97 and 99. The time segment 99 provides an indication of an amount of time or percentage that the VST can receive additional frames or data values of the VDP before prior instances of the received VDP are overwritten or otherwise deleted for storage of additional frame or data values of the VDP, relative to the time segments 97 and 98.

The VDP line graph 80 can be zoomed in or out within the VDP graph window 78 via a user interface of the VST 31. As an example, the cursor positioner 96 can be moved in a first direction (e.g., to the right) in order to zoom in on the VDP line graph 80 and moved in a second direction (e.g., to the left) in order to zoom out on the VDP line graph 80. As another example, the cursor 100 or a cursor bar 102 could be moved in the first and second directions to zoom in and zoom out, respectively, of the VDP line graph 80. As another example, zooming in on a VDP line graph can include decreasing the time represented horizontally within the VDP graph window 78 and zooming out on a VDP line graph can include increasing the time representing horizontally with the VDP graph window 78. Alternatively, repositioning the cursor 100 or the cursor bar 102 can include representing a current value of a VDP at another position within the VDP graph window 78.

Figure 12:
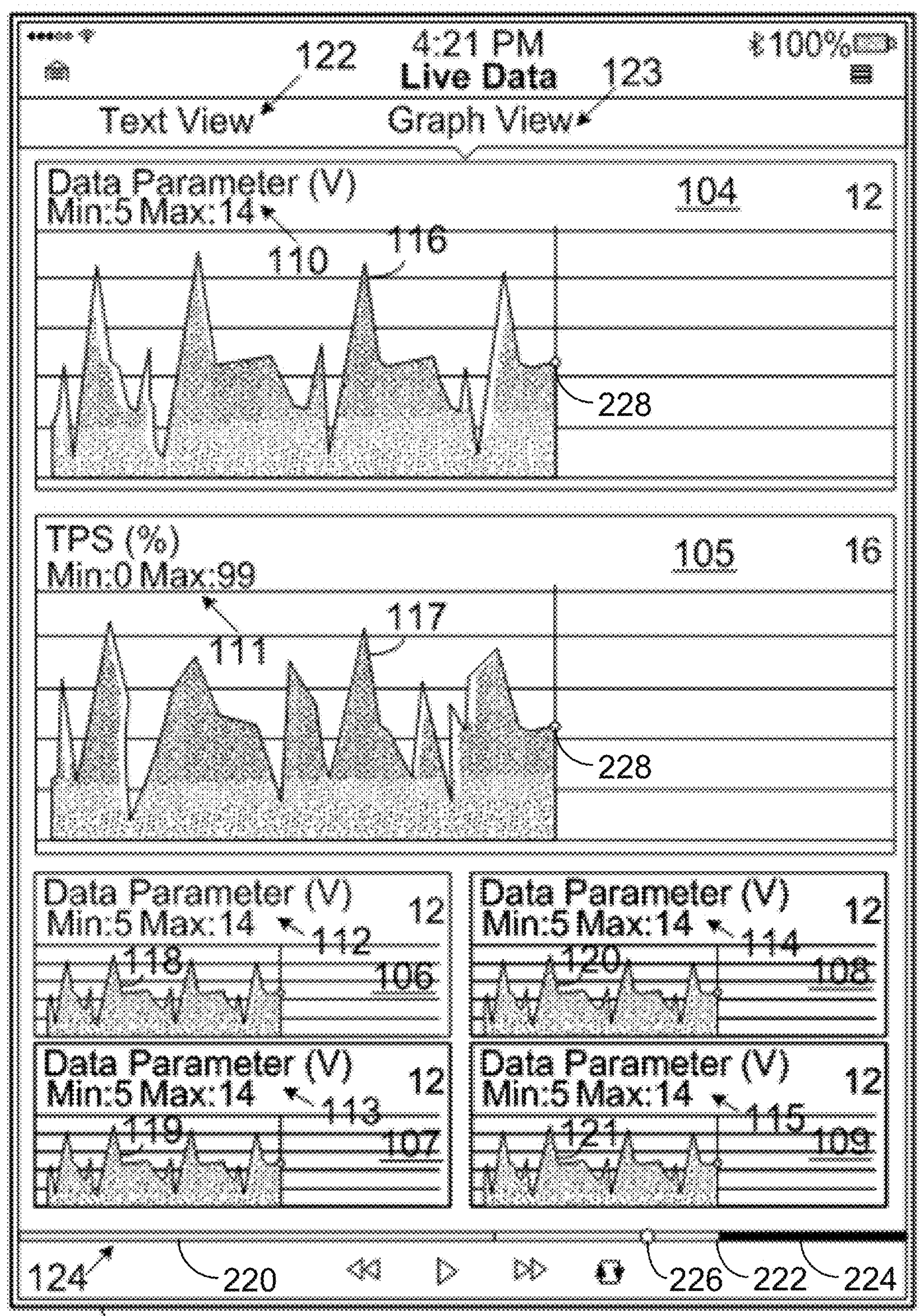
FIG. 12 is a diagram depicting another example display presentation.

Next, FIG. 12 is a diagram depicting another example display presentation 103 that the VST 31 may display on the display 32. The DP 103 is shown in a portrait orientation, but can be displayed in another orientation (e.g., landscape) within other examples. As such, the DP 103 displays VDP graph windows 104, 105, 106, 107, 108, and 109 that include VDP graph lines 116, 117, 118, 119, 120, and 121, and VDP graph text 110, 111, 112, 113, 114, and 115, respectively. Other examples are possible.

The VDP graph text 110-115 may provide text that identifies a different PID for each VDP graph window shown in the DP 103. For instance, the VDP graph text 110 may be associated with a particular PID and can specify units for the data values of the VDP graph line 116 and at least one of a minimum data value and a maximum data value. The minimum and maximum data values can indicate a low VDP threshold and a high VDP threshold, respectively, but are not so limited. For example the minimum and maximum data values can indicate a minimum data value and a maximum data value of the VDP currently displayed within the VDP graph window including or associated with the VDP graph text.

The DP 103 further includes a text view selector 122 and a graph view selector 123. While the display 32 of the VST 31 is displaying VDP graph windows in a graph view as shown in FIG. 12, the text view selector 122 can be selected by the display pointer, or otherwise (e.g., via a touch screen or a voice command), to cause the display to begin displaying the VDP shown in one or more of the VDP graph windows 104, 105, 106, 107, 108, and 109, or the data represented therein, in a textual format. While the display is displaying VDP in a textual format, the graph view selector 123 can be selected by the display pointer or otherwise (e.g., via a touch screen, voice input) to cause the display to begin displaying the VDP graph windows 104, 105, 106, 107, 108, and 109.

The DP 103 includes the time-based indicator 124 with time segments 220, 222, 224, a cursor positioner 226, and a cursor 228 within each of the VDP graph windows 104, 105, 106, 107, 108, and 109. The cursor positioner 226 can be moved in either direction along the time-based indicator 124 to cause uniform movement of the cursor 228 within each of the VDP graph windows 104, 105, 106, 107, 108, and 109.

Figure 13:
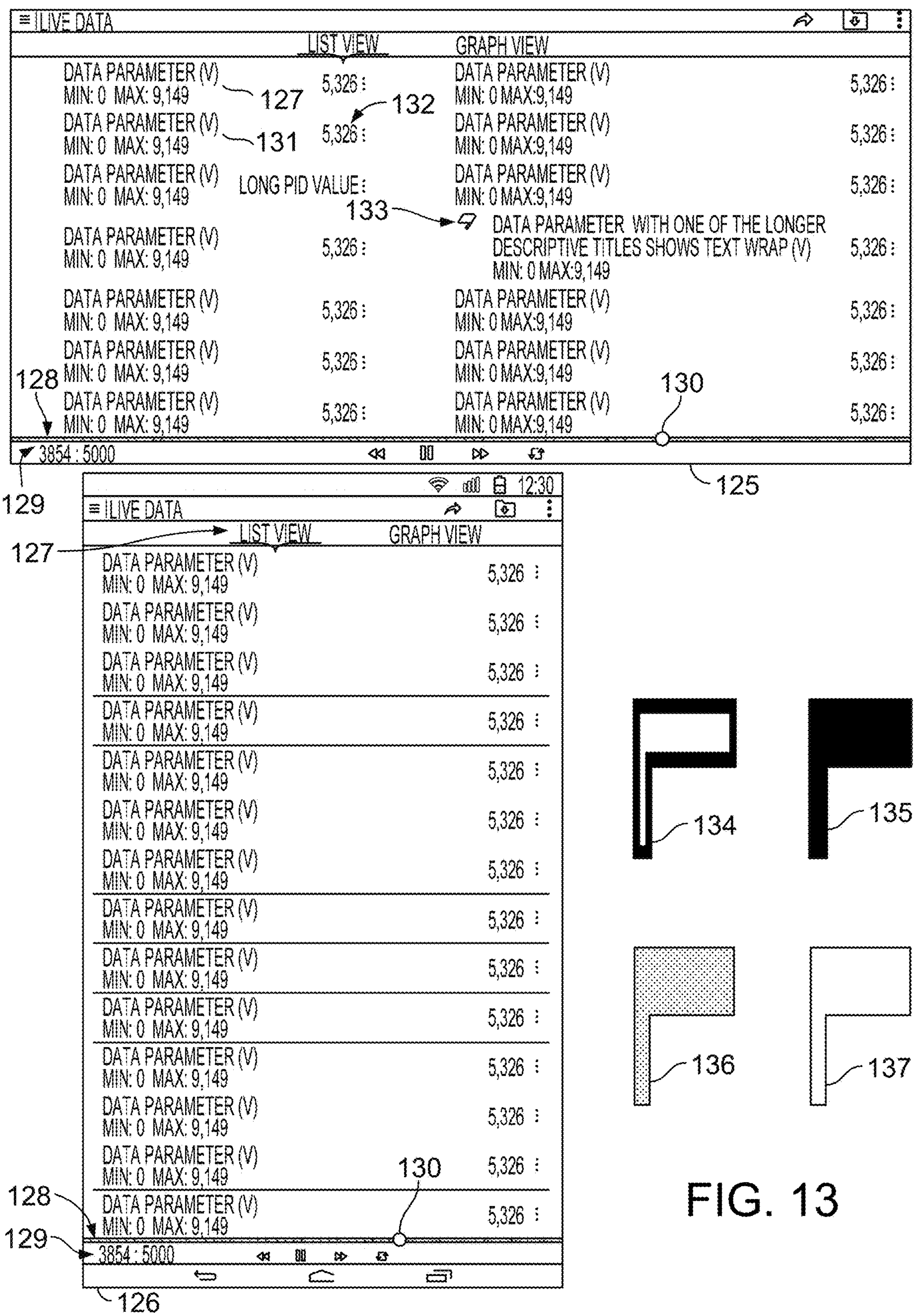
FIG. 13 is a diagram depicting multiple example display presentations.

Next, FIG. 13 is a diagram depicting example display presentations 125 and 126 that can be provided by a device via a display or graphical user interface. For instance, example devices that may display DPs 125, 126 can include the VST 31, a smartphone, or another type of device with a graphical user interface. The DPs 125, 126 include the DP selector 127 that can enable viewing a different VDP display presentation or displaying other information (e.g., a list of PIDs by selecting "LIST VIEW" or a graph of PIDs by selecting the "GRAPH VIEW". For instance, a selection of DP selector 127 causes DP 126 to display a different VDP display presentation (e.g., a list view presentation or graph view presentation). Either one of the DP 125 and the DP 126 may be entered from another type of view, such as a graph view or a digital view, by selection of the list view from a DP selector 127 in the other type of view.

Each of the DP 125 and the DP 126 include the time-based indicator 128 and a frame or data value indicator 129. As an example, the frame or data value indicator 129 indicates 3,834 of 5,000 frames or data values. In some cases, the VST 31 may have received an identical number of data values for each VDP identified in the list view of VDP. In accordance with those cases, the cursor position 130 can be moved to select a different frame or data value of the 5,000 frames or data values. In other instances, the VST 31 may receive a different number of data values for two or more VDP identified in a list view of VDP. In accordance with these other cases, the cursor positioner 130 can be moved to select a different frame or different value of the received frames or data values for a designated VDP. The data values for the other VDP can change to other data values in relation to the time at which the selected different frame or data value was received.

As shown in FIG. 13, a list view of VDP can include multiple VDP text identifiers (e.g., VDP text identifier 131) and multiple VDP values (e.g., VDP value 132). A VOC indicator 133 is displayed for a VDP for which data values of that VDP breeched a VDP threshold (e.g., greater than an upper threshold or lower than a lower threshold). The processor 23 can detect a drag-and-drop input of a VDP displayed in a list view and move the VDP from its initial position when the drag-and-drop input is initiated to a position that includes the location to which the VDP was dragged and dropped by the drag-and-drop input.

The DP 125 and the DP 126 can include at least one scroll bar for entry of a scroll input that causes virtual VDP values not currently displayed by the DP 125 or the DP 126 to be displayed and to cause one or more currently displayed VDP values to be repositioned as a virtual VDP value that is not currently displayed by the DP 125 or the DP 126.

The processor 23 can execute program instructions of the CRPI 27 to provide a VDP threshold selection display by the display 32. The selection display can include selection of a VDP. The selection display can include a selection of at least one VDP threshold associated with the selected VDP or the VDP threshold(s) can be selected by default upon selection of the VDP. The selection display can include a selection of a VOC indicator for a VDP or a VDP threshold or the VOC indicator selection can be selected by default upon selection of the VDP or the VDP threshold.

FIG. 13 further shows VOC indicators 134, 135, 136, and 137 as examples of VOC indicators displayable by the display 32 on the VST 31. As shown in FIG. 13 and in other figures, each VOC indicator can include a flag and flagpole icon, but the VOC indicators are not so limited. Furthermore, the display 32 can display the VOC indicators with different colors or shading to indicate various characteristics with respect to a VDP threshold or a VOC. In one respect, the VOC indicator 134 includes an outlined flag (e.g., a white flag outlined in red) and the VOC indicator 135 includes a solid flag (e.g. a red flag). An outlined flag can be displayed to indicate that a VDP threshold is armed, but that the VDP values received for the VDP have not yet breached the VDP threshold. A solid flag can be displayed to indicate that a VDP value received for the VDP has breached an associated VDP threshold that was armed. Arming a VDP threshold can occur by selecting the VDP for display, by selecting a VDP threshold for a VDP, or by another manner. Upon arming a VDP threshold, the processor 23 can compare the VDP the VST receives to determine if the VDP is associated with the VDP threshold and whether it breaches the VDP threshold.

Additionally, the display 32 can display text associated with a VDP (e.g., a PID) in proximity to a VOC indicator. The display 32 can display the associated text in various ways to further indicate whether a VDP threshold has been breached. For example, the text associated with the VDP can be blue when a VDP threshold is armed, but not yet breached, and the associated text can be red when the armed VDP threshold has been breached. The processor 23 can cause the associated text to change colors in response to detecting the VDP threshold being breached.

In another respect, the VOC indicator 137 (e.g., a white flag) can indicate that a VDP high threshold has been breached, whereas the VOC indicator 136 (e.g., a gray shaded flag) can indicate that a VDP low threshold has been breached. In yet another respect, if VDP thresholds have been set up and armed for multiple VDP, then a VOC indicator for each VDP can be associated with a respective color or respective shading to distinguish the VOC indicators for each of the multiple VDP. Other colors, visual representations, and configurations are possible.

Figure 14:
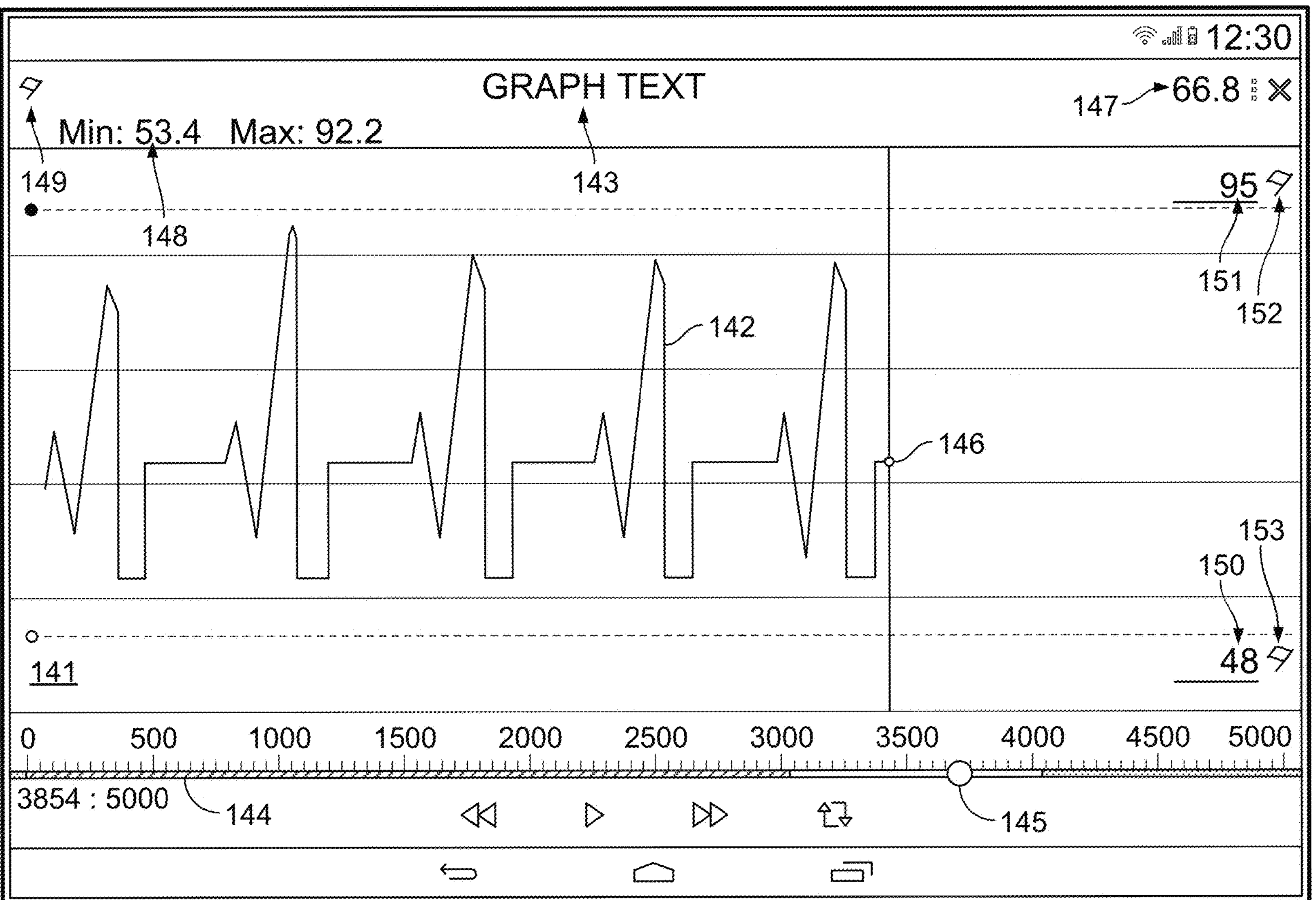
FIG. 14 is another diagram depicting an example display presentation.

Next, FIG. 14 is a diagram depicting an example display presentation 140 that can be provided by a display, such as the display 32 on the VST 31. The DP 140 includes a VDP graph window 141 with a VDP line graph 142 for a VDP identified by the VDP graph text 143. As such, the VDP graph window 141 includes the time-based indicator 144, the cursor positioner 145, and the cursor 146, and further includes a digital VDP value 147 that indicates a value of the VDP at the cursor 146. The VDP graph window includes thresholds that represent minimum and maximum values 148 of the VDP displayed in the VDP line graph 142 or of the VDP stored in the VDP for the VDP identified by the VDP graph text 143.

The VDP graph window 141 includes a threshold arm status icon 149. The threshold arm status icon 149 can include an empty flag icon (e.g., VOC indicator 134) when a threshold for the VDP indicated by the VDP graph text 143 is not armed. The processor 23 may not compare data values of the received VDP to a VDP threshold when the threshold is not armed. The VDP graph window 141 includes a lower threshold indicator 150 that indicates a numeric value of the lower threshold of the VDP displayed in the VDP graph window 141.

The VDP graph window 141 includes an upper threshold indicator 151 that indicates a numeric value of the upper threshold of the VDP displayed in the VDP graph window 141. The VDP graph window 141 includes a VOC indicator 152 associated with the upper threshold of the VDP and a VOC indicator 153 associated with the lower threshold of the VDP. Any one more other VDP graph windows described herein can include one or more of the elements included within the DP 140.

Figure 15:
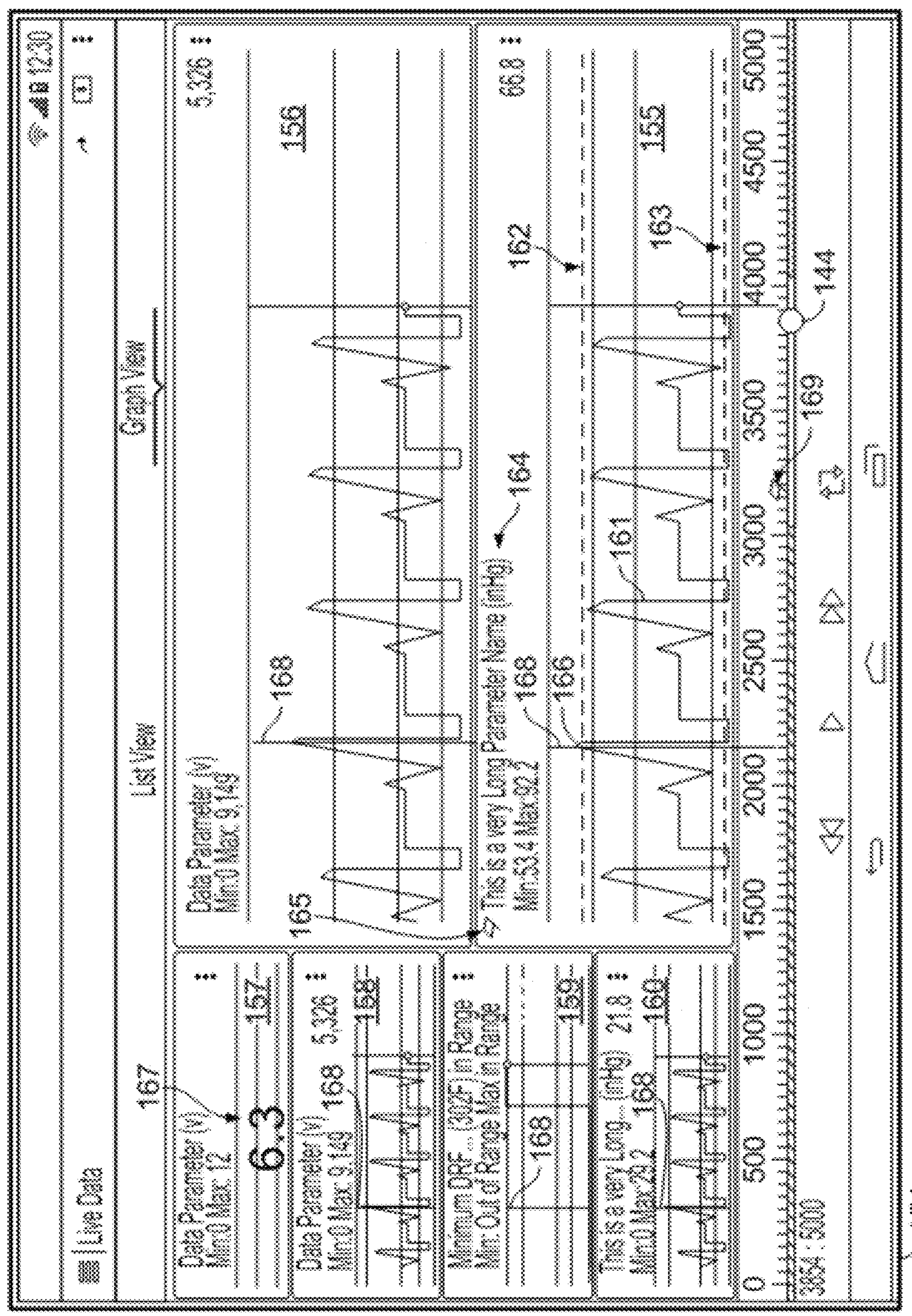
FIG. 15 is a diagram depicting another example display presentation.

Next, FIG. 15 is a diagram depicting an example display presentation 154 that can be provided by a display, such as the display 32 on the VST 31 or a graphical user interface on another computing device. The DP 154 includes the VDP graph windows 155, 156, 157, 158, 159, and 160 with corresponding VDP line graphs displaying parameters relating to a set of associated PIDs. For instance, the VDP graph window 155 includes the VDP line graph 161, the upper threshold indicator 162, and the lower threshold indicator 163, the VDP graph text 164, and the threshold arm status icon 165. In the DP 154, the threshold arm status icon 165 can include a solid (i.e., un-empty) flag of a second icon color (e.g., red) to indicate that the VDP threshold associated with the VDP represented by the VDP line graph 161 is armed and has been breached at the VDP value 166 of the VDP line graph 161.

The value and color of the digital value 167 within the VDP graph window 157 can change as the cursor positioner 144 is repositioned. For example, the color of the digital value 167 can be the same as the first color of the threshold arm status icon 165 when the VDP threshold associated with that icon is not breached and can be the same as the second color of the threshold arm status icon 165 when the VDP threshold associated with that icon is breached. In one respect, the color of the digital value can be the second color if the cursor positioner is positioned at position representing a time when the VDP threshold was initially breached. In another respect, the color of the digital value can be the second color if the cursor positioner is positioned at a position representing any time when the VDP threshold remained breached. The VDP graph text within the VDP graph window can be the same as color of the digital value 167. The DP 154 includes the time-based indicator and the cursor positioner 144.

Upon a VDP threshold for a PID being breached, a VOC indicator 169 can be displayed in proximity to the time-based indicator 144. When the VOC indicator 169 is displayed in proximity to the time segment, the VDP value is displayed within the VDP graph window along with a VOC indicator bar 168. VOC indicator bars 168 are also displayed within the VDP graph windows to indicate a location with those VDP graph windows that corresponds to a time at which the VDP threshold was breached at the VDP value. Any one more other VDP graph windows described herein can include one or more of the elements included within the DP 154.

Figure 16:
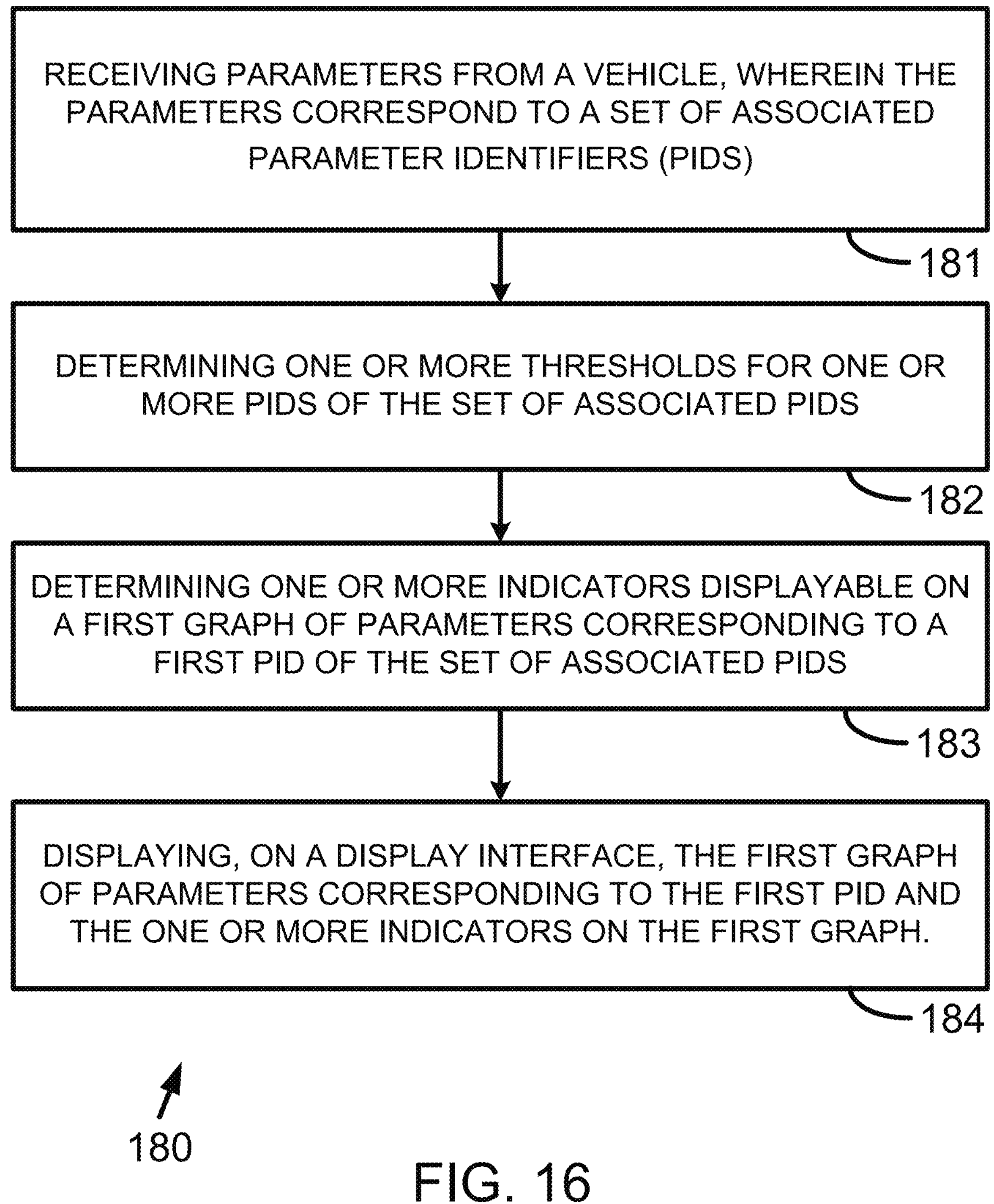
FIG. 16 is a flowchart depicting a set of functions that can be carried out in accordance with the example embodiments.

FIG. 16 shows a flowchart depicting a set of functions 180 (or more simply "the set 180") that can be carried out in accordance with the example embodiments described in this description. The set 180 includes the functions shown in blocks labeled with whole numbers 181 through 184 inclusive. The following description of the set 180 includes references to elements shown in other figures described in this description, but the functions of the set 180 are not limited to being carried out only by the referenced elements. A variety of methods can be performed using all of the functions shown in the set 180 or any proper subset of the functions shown in the set 180. Any of those methods can be performed with other functions such as one or more of the other functions described in this description.

Block 181 includes receiving parameters from a vehicle, wherein the parameters correspond to a set of associated parameter identifiers (PIDs). The computing system 2 can receive vehicle data parameters (VDP) from the vehicle 8 via a wired or wireless connection. As such, the VDP may represent information corresponding to a number of related PIDs that form the set of associated PIDs. Within examples, the association between PIDs can vary. For instance, the association between the PIDs can depend on particular vehicle operations or predefined relationships between the PIDs. Other examples are possible.

The PIDs can represent different operations of the vehicle. For instance, the PID value can include information indicating specified values of parameters associated with a vehicle component (e.g., sensor values).

In some examples, the VST 31 described in FIG. 5 can be configured to obtain the VDP from the vehicle 8 in the form of a vehicle data message (VDM) (e.g., a serial data message).

For instance, the VST 31 may use the DLC or another component to communicate with the vehicle 8 to obtain the VDP that describe operations of the vehicle 8. As an example implementation, the VST 31 may receive the VDP from the vehicle 8 in the form of an electrical signal.

Block 182 includes determining one or more thresholds for one or more PIDs of the set of associated PIDs. The thresholds may represent thresholds for parameters relating to given PIDs of the set of associated PIDs.

A "baseline value" is a value captured at some point in time from a measurement carried out on the vehicle (or on other vehicles of the same YMM of the vehicle), such as a measurement carried out by a digital volt-ohmmeter or a diagnostic scan tool that interrogates the ECU for PID values. The thresholds may depend on determined baseline values. For example, a threshold can comprise a mean value of an aggregation of baseline values captured over time. As a general matter, thresholds can be stored with operating characteristics, such as engine RPM or temperature. For example, a threshold can comprise a maximum parameter value of a PID at a particular RPM value or a particular temperature value.

In some example implementations, the VST 31 may determine the thresholds based on information stored in memory 26. For instance, the VST 31 may access previously stored thresholds for given PIDs of the set of associated PIDs. In other examples, the VST 31 may request and receive thresholds from the server 4. For instance, the VST 31 may transmit a request to the server 4 via the communication network 6. The request may specify information relating to one or more PIDs in order to receive thresholds specific for the PIDs. Responsive to the request, the server 4 may transmit thresholds using threshold 57 stored in memory 49 as shown in FIG. 6.

In some instances, the thresholds can be developed or obtained when the vehicle 8 is operating without fault. As such, data values captured when the vehicle is operating with a fault can be compared to the thresholds, thereby giving the vehicle or the technician an indication as to what the fault is (baseline values could also be compared with data values when the vehicle is operating without fault to provide confirmation the vehicle is operating as expected). Still further, the thresholds can also be obtained for a single unique vehicle and compared to baseline values captured later from that same exact vehicle. Yet still further, any threshold can take the form of a single value (e.g., 4.65 V) or a range of values (e.g., 4.5-4.8 V). In some examples, the threshold data information can include, for instance, electrical measurements of the vehicle component including a baseline value, such as the baseline voltage waveform discussed below.

Block 183 includes determining one or more indicators displayable on a first graph of parameters corresponding to a first PID of the set of associated PIDs. The VST 31 may determine indicators to display on the VDP line graph corresponding to the first PID. For instance, the indicators can be displayed in various representations, such as vertical cursors or other forms of indicators comprising particular information relating to PIDs in the set of PIDs. The indicators may be selectable via a cursor, touchscreen, or other method on the VST 31. As such, the VST 31 may display the indicators on a VDP line graph representative of VDP associated with a given PID of the set of associated PIDs.

In some examples, the indicators can represent information relating to different PIDs in the set of associated PIDs. For instance, although the VST 31 may display a single VDP line graph at a given time, the VST 31 may arrange the indicators on the VDP line graph based on a temporal order with respective indicators corresponding to either the particular PID represented by the VDP line graph or other PIDs of the set of associated PIDs. As an example, a particular indicator positioned on the VDP line graph for a first PID may represent a breach of a threshold associated with a second PID. As such, the VST 31 may enable selection of the particular indicator to allow the user to view a VDP graph for the second PID at the given breach or perform other operations.

In some instances, the one or more indicators can include multiple types of indicators, which may involve different visual representations to differentiate among the types of indicators. For instance, the indicators can include a first type of indicator and a second type of indicator with the first type of indicator having a different visual representation from the second type of indicator. As an example, the first type of indicator can be displayed as a vertical cursor having a first color (e.g., grey) and the second type of indicator can be displayed as a vertical cursor having a second color (e.g., red). The difference in color can signal to a user of the VST 31 that the indicators represent different information (e.g., correspond to different PIDs). The one or more indicators can additionally be displayed with corresponding flags representative of information associated with each indicator. For instance, the one or more indicators can include one or more of the VOC indicators 134-137 shown in FIG. 13.

Block 184 includes displaying, on a display interface, the first graph of parameters corresponding to the first PID and the one or more indicators on the first graph. The VST 31 may display a VDP graph relating to the first PID along with the indicators in a VDP graph window. As previously discussed herein, the VST 31 may display the VDP graphically or in other forms via the display 32.

Figure 17:
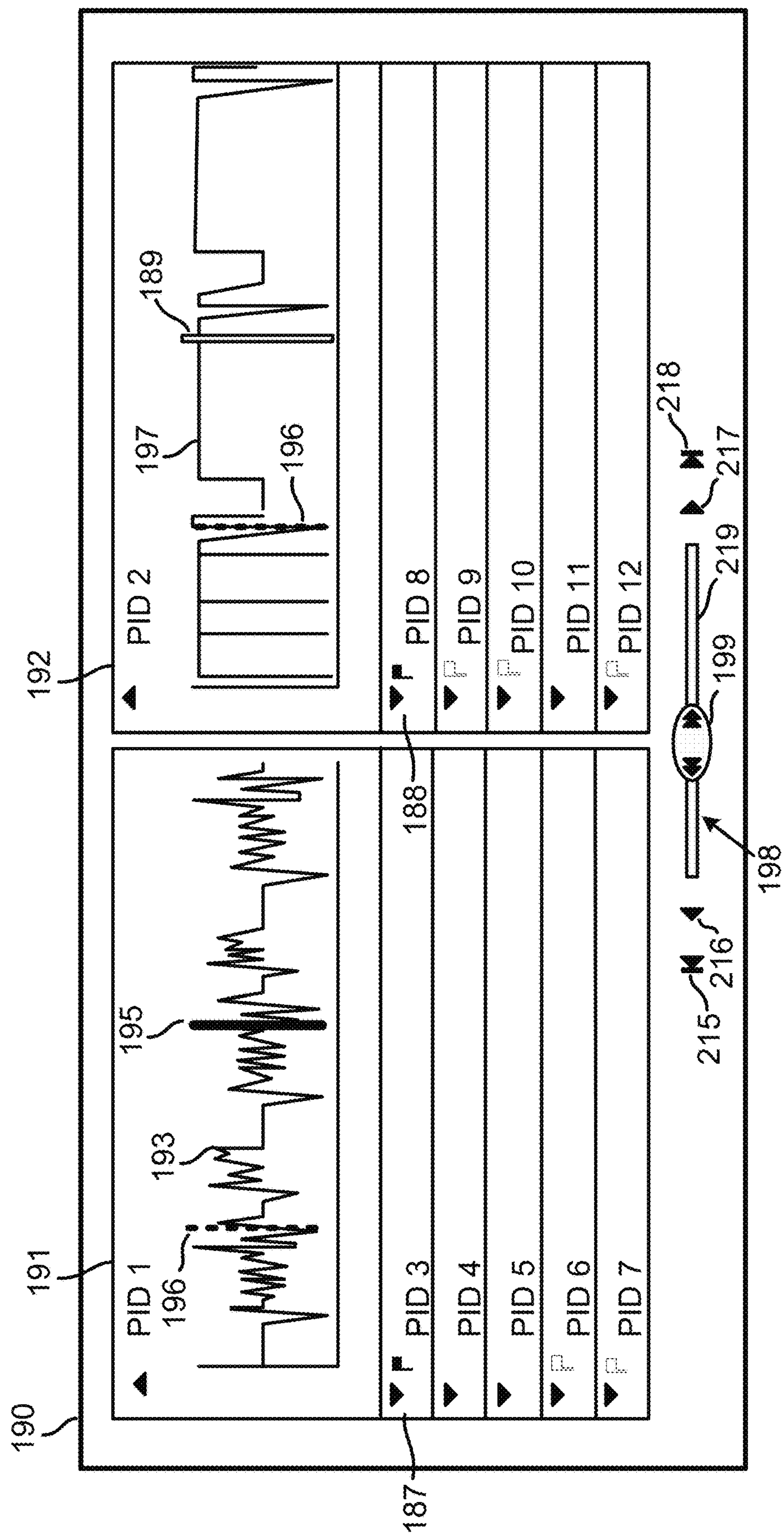
FIG. 17 is another diagram depicting an example display presentation.

In some examples, displaying the first graph of parameters corresponding to the first PID and the one or more indicators on the first graph includes displaying the one or more indicators based on a temporal order. Particularly, each indicator can be displayed in an arrangement that depends on a time that a breach or other occurrence represented by the indicator occurred. For example, FIG. 17 is a diagram depicting an example display presentation, which the VST 31 may display on the display 32. Particularly, the DP 190 includes a VDP graph window 191 and a VDP graph window 192 that represent information related to two PIDs of a set of associated PIDs, respectively.

The VDP graph window 191 includes the VDP line graph 193 that represents parameters corresponding to a PID ("PID 1") of a set of associated PIDs. Similarly, the VDP graph window 192 includes a VDP line graph 197 that represents parameters corresponding to another PID ("PID 2") of the set of associated PIDs. PID 1 and PID 2 are part of a set of associated PIDs from the vehicle 8 that further includes PID 3 through PID 12 further displayed on the DP 190. Besides a graph view, other views can include, but are not limited to, a digital view and a list view. The VDP line graphs 193, 197 represent examples of line graphs in which the area below the line graph is not shaded. A digital view can comprise a view in which a digital value representing one or more PID parameters, such as the digital value 167 shown in FIG. 15, is displayed.

The VDP graph window 191 includes indicator 195 and indicator 196 shown as vertical indicators on the VDP line graph 193. These indicators 195, 196 as well as other possible indicators may convey information related to the parameters of PID 1 or other PIDs of the set of associated PIDs. For example, indicator 196 may represent a threshold breach of a minimum or maximum threshold associated with PID 1 and indicator 195 may represent a threshold breach of a minimum or maximum threshold associated with PID 2. The indicators 195, 196 as well as other indicators that may be included on the VDP line graph 195 may be selectable to cause the VST 31 to provide options or perform other operations depending on which indicator is selected. As such, the VDP graph window 192 with the VDP line graph 197 is shown having an indicator 196 that corresponds to the indicator 196 positioned on the VDP line graph 193 shown in the VDP graph window 191.

Indicator 195 is shown as a solid vertical indicator and indicator 196 is shown as a dotted vertical indicator (with constant length dots or dashes). In further examples, indicators 195, 196 may include colors that further provide information to a user of the VST 31. For instance, indicator 195 may have a grey color and indicator 196 may have a red color. In other examples, indicators 195, 196 can have other forms of visual representations as well as other characteristics (e.g., different sizes, colors, etc.). Further, the indicators 195, 196 may also have corresponding flags, such as the VOCs 134-137 shown in FIG. 13. As an example implementation, the VST 31 in response to detecting a selection of the indicator 196, the VST 31 may highlight or display the VDP graph window 192 showing the VDP line graph 197 with the corresponding indicator 196. The VDP graph window 192 also includes an indicator 189 shown as a dotted line (with alternate short and long dots or dashes). The indicator 189 can relate to another PID within the set of PIDS, such as PID 8.

The DP 190 includes a graph view control 198 operable to modify a view of each VDP line graph currently displayed by the VST 31. The graph view control 198 can include a graph view control slider 199, a reverse-to-beginning selector 215, a reverse selector 216, a forward selector 217, a forward-to-present selector 218, and a time bar 219.

The processor 23 can determine a use of the graph view control 198 and responsively modify each displayed VDP line graph to show a graph of a set of VDP parameter values for the pertinent PID that the VST 31 received prior to the set of VDP parameter values displayed at the time of using the graph view control 198. As an example, the use of the graph view control 198 causing such modification can comprise sliding the graph view control slider 198 to the left of its current position in the time bar 219, selection of the reverse-to-beginning selector 215, selection of the reverse selector 216, or selection of a part of the time bar 219 to the left of the graph view control slider 198.

The processor 23 can determine a use of the graph view control 198 and responsively modify each displayed VDP line graph to show a graph of a set of VDP parameter values for the pertinent PID that the VST 31 received after the set of VDP parameter values displayed at the time of using the graph view control 198. As an example, the use of the graph view control 198 causing such modification can comprise sliding the graph view control slider 198 to the right of its current position in the time bar 219, selection of the reverse-to-present selector 218, selection of the forward selector 217, or selection of a part of the time bar 219 to the right of the graph view control slider 198.

Some of the VDP parameter values of the sets of VDP parameter values displayed prior to use of graph view control 198 and in response to use of the graph view control 198 can be common to both sets (i.e., VDP parameter values received during a common time period). Alternatively, the VDP parameter values of the sets of VDP parameter values displayed prior to use of graph view control 198 and in response to use of the graph view control 198 can be from two mutually exclusive time periods.

The DP 190 includes VDP graph window selectors for PID 3 to PID 12. A VDP graph window selector can include a VOC. For example, VDP graph window selectors 187 and 188 each show a VOC in the form of a black flag to indicate a VDP parameter value for PID 3 and PID 8, respectively, has breached a VDP threshold. A breach of the VDP threshold for PID 8 can be represented by the indicator 189. The VDP graph window selectors for PID 6, PID 7, PID 9, PID 10, and PID 12 each show a VOC in the form of a white flag to indicate the VDP thresholds for those PID are armed, but not breached.

The processor 23 can determine the selection of the indicator 189 has occurred and responsively cause a VDP line graph of PID 8 to be shown on the display 32. The processor 23 may continue displaying other VDP line graphs, such as the VDP line graphs in VDP graph windows 191 and 192 or can stop displaying at least one other VDP line graph being displayed at the time the processor 23 determines selection of the indicator 189 occurred. Selection of the indicator 189 can cause the processor 23 to determine the VDP parameter values of PID 8 that were received during the same time period of any other PID that is to be displayed via a VDP line graph along with a VDP line graph of PID 8 such that those VDP line graphs represent a common time period.

Figure 18:
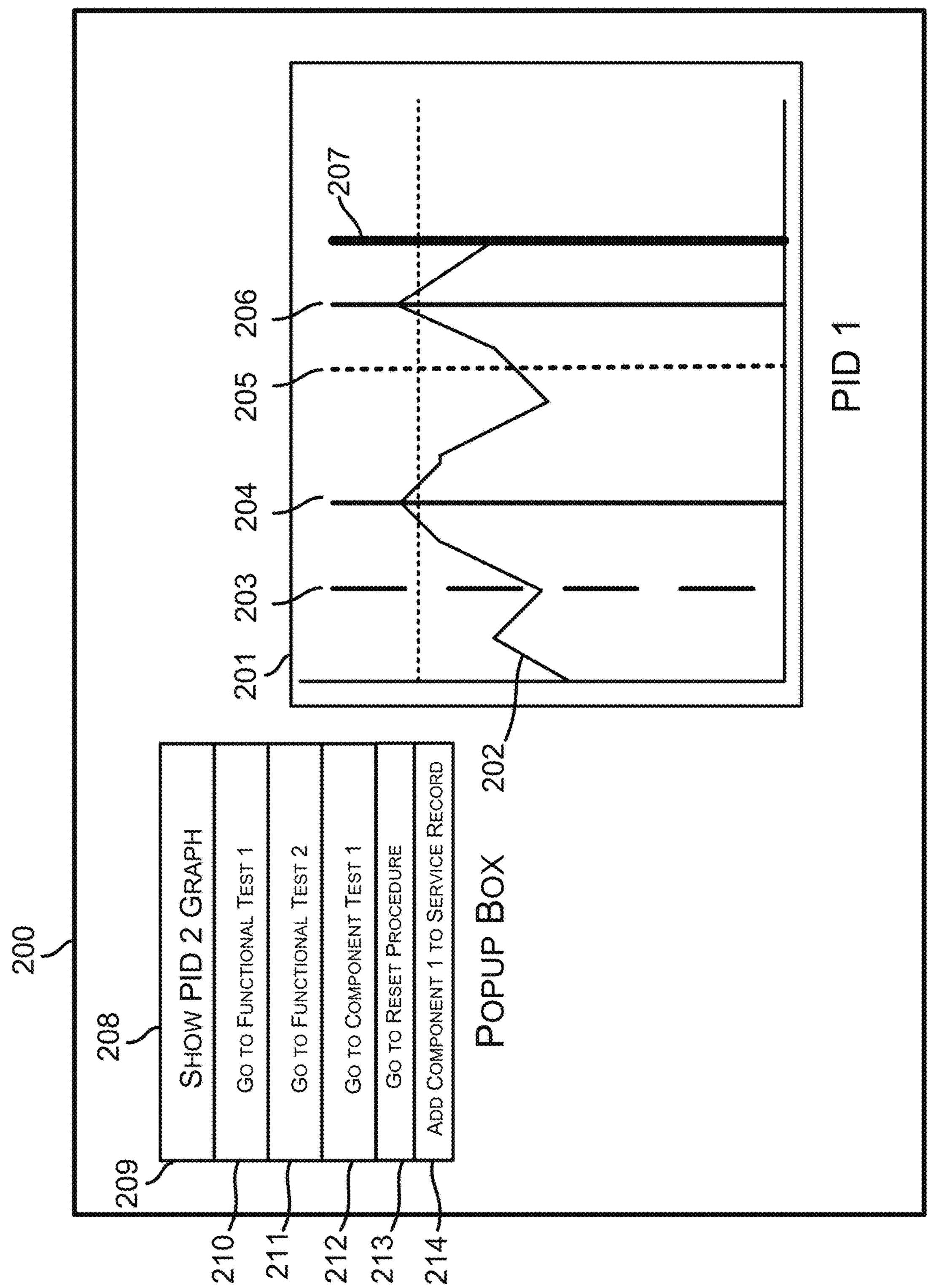
FIG. 18 is a diagram of another example display presentation.

FIG. 18 is a diagram of another example display presentation. The DP 200 includes a VDP window 201 that includes VDP line graph 202. The VDP line graph 202 includes multiple indicators, such as indicator 203, indicator 204, indicator 205, and indicator 206, and further includes a cursor bar 207. In some examples, the color or style of the indicators 203-206 can depend on which PID each indicator pertains to.

The DP 200 further includes popup box 208 shown positioned to the side of the VDP window 201. The VST 31 may display the popup box 208 in response to a selection of an indicator on the VDP line graph 202. For instance, the VST 31 may display the popup box 208 in response to detecting a selection of the indicator 203 in an example where the indicator 203 corresponds to parameters related to PID 2 of the set of associated PIDs. After receiving the selection of the indicator 203, the VST 31 may cause the popup box 208 to be displayed on the display 32 to show options associated with the selected indicator 203. The VST 31 may also automatically display a VDP line graph related to PID 2 in response to detecting a cursor hovering above the indicator 203 or a selection of the indicator 203.

The indicator 204 represents a breach in a threshold associated with the VDP line graph 202 depicting parameters related to PID 1 of the set of associated PIDs. Similarly, the indicator 205 represents a breach in a threshold associated with parameters related to PID 3 of the set of associated PIDs. In other examples, the VDP line graph 202 may include more or less indicators that represent information related to PID 1 or other PIDs in the set of associated PIDs.

The indicator 206 represents another breach in a threshold associated with the VDP line graph 202 depicting parameters related to PID 1 of the set of associated PIDs. The breach represented by the indicator 206 can correspond to the same threshold as represented by the indicator 204. In a further example, the indicator 206 may represent a breach of a different threshold associated with the VDP line graph 202 depicting parameters related to PID 1 of the set of associated PIDs.

The cursor bar 207 may be a movable cursor that a user can select and move to alter the time frame depicted by the VDP line graph 202. The VST 31 may further display the indicators with corresponding VOCs (e.g., flags) that represent information associated with each indicator. For instance, the VOCs may signal breaches of a threshold associated with the displayed PID or another PID.

As shown in FIG. 18, the popup box 208 includes multiple options selectable by a user. The popup box 208 may appear when the VST 31 detects a selection of the indicator 203. In particular, the popup box 208 includes options that correspond to the PID 2 since the indicator 203 represents a threshold breach associated with the PID 2. In some instances, the popup box 208 may appear when the VST 31 detects a selection of another indicator depicted on the VDP line graph 202. The options displayed in the popup box 208 can represent tests that can be performed related to the PID associated with the selected indicator. In a further example, the VST 31 may display the popup box 208 when the VST 31 detects the presence of a cursor positioned above a displayed indicator. The VST 31 may enable selection of an indicator via touch screen, cursor selection, voice command, or other possible methods. Although the popup box 208 is shown as a popup box, in other examples, the options can be displayed in another window or other forms of graphical or textual representations.

A first option 209 comprises a selector selectable to show a VDP line graph that represents parameters related to PID 2 of the set of associated PIDs. Upon receiving a selection of the first option 209, the VST 31 may display a VDP line graph related to PID 2. In a further example, the VST 31 may display a VDP line graph related to PID 2 in response to detecting a cursor hovering above the indicator 203 or a selection of the indicator 203.

A second option 210 comprises a selector selectable to perform a functional test 1. Particularly, upon receiving a selection of the second option 210, the VST 31 may switch into a mode to perform a functional test 1 as selected by a user. The VST 31 may perform the functional test 1 upon detecting a selection of the second option 210 or switch to a mode in which the VST can perform the functional test 1. The VST 31 can configure itself to perform the functional test 1 for a particular vehicle connected to the VST 31. The functional test 1 in the second option 210 can correspond to the "Functional Test 1" shown in FIG. 9, a different functional test shown in FIG. 9, or some other functional test applicable to a PID displayed in the VDP line graph 202 or to a PID represented by an indicator in the VDP window 201. In particular, the functional test 1 may correspond to a functional test executable to a vehicle component that outputs PID 2 or that affects PID data values for PID 2 since the selected indicator 203 represents a threshold breach associated with PID 2.

The third option 211 is similar to the second option 210 and may involve performing another functional test (i.e., functional test 2). The VST 31 may perform the functional test 2 in response to receiving a selection of the third option 211 or switch to a mode in which the VST 31 can perform the functional test 2 for a particular vehicle connected to the VST 31. The VST 31 can configure itself to perform the functional test 2 for a particular vehicle connected to the VST 31. The functional test 2 in the third option 211 can correspond to the "Functional Test 2" shown in FIG. 9, a different functional test shown in FIG. 9, or some other functional test applicable to a PID displayed in the VDP line graph 202 or to a PID represented by an indicator in the VDP window 201. In particular, the functional test 2 may correspond to a functional test executable to a vehicle component that outputs PID 2 or that affects PID data values for PID 2 since the selected indicator 203 represents a threshold breach associated with PID 2.

The fourth option 212 shown in the popup box 208 may involve the VST 31 performing a component test 1. As such, the VST 31 may switch to a component meter mode and perform the component test 1 in response to detecting a selection of the fourth option 212 or configure itself for component test 1 to be performed based on a further user input. The component test 1 in the fourth option 210 can correspond to the "Component Test 1" shown in FIG. 8, a different functional test shown in FIG. 8, or some other functional test applicable to a PID displayed in the VDP line graph 202 or to a PID represented by an indicator in the VDP window 201. The component test 1 may correspond to a component test related to a vehicle component that outputs PID 2 or that affects PID data values for PID 2 since the selected indicator 203 represents a threshold breach associated with PID 2.

A fifth option 213 shown in the popup box 208 may involve the VST 31 performing a reset procedure. As such, the VST 31 may switch to a reset procedure mode and perform the reset procedure in response to detecting a selection of the fifth option 213 or configure itself for the reset procedure to be performed based on a further user input. The reset procedure represented by the fifth option can comprise a reset procedure corresponding to a PID displayed in the PID graph or to a PID represented by an indicator in the PID graph. The reset procedure can comprise a reset procedure shown in FIG. 10 or some other reset procedure. For instance, the reset procedure may be related to a vehicle component that outputs PID 2 or that affects PID data values for PID 2 since the selected indicator 203 represents a threshold breach associated with PID 2. In other examples, the popup box 208 may include more or less options. Further, the options may depend on the particular indicator selected or scrolled upon by the user of the VST 31.

A sixth option 214 shown in the popup box 208 may involve the VST 31 adding information to a service record with respect to servicing a vehicle with respect to the PID 2 being breached. As shown in FIG. 18, the sixth option can indicate "Add Component 1 to Service Record." Selection of the sixth option 214 from the popup box 208 can cause the processor 23 to add to the service record one or more of a name of Component 1, a cost of Component 1, and/or a labor charge associated with replacing Component 1 on a vehicle to which the VST 31 is connected. If there is no service record for that vehicle, the processor 23 can generate the service record to include the service record information described above. Additionally or alternatively, the VST 31 can send to the server 4 a request to add the service record information associate with the sixth option to an existing service record for the vehicle connected to the VST 31 or to a new service record for the vehicle connected to the VST 31. A service record to which the service record information is to be added can comprise or be arranged as one or more of a service estimate, a vehicle record, or a repair order pertaining to the vehicle connected to the VST 31. As an example, if PID 2 pertains to a mass air flow (MAF) sensor, the processor 23 or the server 4 can add service record information regarding the MAF sensor to the service record.

Additional methods including the functions of set 180 can be performed to display and use PID graph indicators.

A first additional method including the functions of the set 180 includes: (i) receiving a selection of an indicator of the one or more indicators, and (ii) responsive to the selection of the indicator, displaying, on the display interface, a representation of options associated with the selected indicator. For instance, displaying the representation of options associated with the selected indicator can involve displaying the representation of options as a popup box (e.g., popup box 208 shown in FIG. 18) in a foreground on the display interface. In some examples, the popup box is displayed in front of a portion of the first graph of parameters corresponding to the first PID of the set of associated PIDs. In turn, the VST 31 may require the user to select an option in the popup box or exit the popup box prior to enabling the user to view the entire first VDP graph.

In other examples, the popup box is displayed to a side of the first graph of parameters corresponding to the first PID of the set of associated PIDs. For example, the DP 200 displayed in FIG. 18 shows the popup box 208 displayed to the left of the VDP graph window 201. In further examples, the popup box can also be displayed in other ways.

The representation of options can include one or multiple options within examples. For instance, the options can include a first option, which when selected, causes the computing system to display another graph of parameters corresponding to another PID associated with the selected indicator.

The representation of options can also include a second option, which when selected, causes the computing system to perform, on the vehicle, a functional test associated with the selected indicator. In addition, the representation of options can also include a third option, which when selected, causes the computing system to switch to a component meter mode for performing a component test associated with the selected indicator.

A second additional method including the functions of the set 180 includes: (i) receiving, by the computing system, a selection of the first option, and (ii) responsive to receiving the selection of the first option, displaying, by the computing system, a graph of parameters that corresponds to a given PID associated with the selected indicator.

A third additional method including the functions of the set 180 includes: (i) receiving, by the computing system, a selection of the second option, and (ii) responsive to receiving the selection of the second option, performing, by the computing system, the functional test associated with the selected indicator on the vehicle.

A fourth additional method including the functions of the set 180 includes: (i) receiving, by the computing system, a selection of the third option, (ii) responsive to receiving the selection of the third option, switching, by the computing system, to the component meter mode, and (iii) performing, by the computing system, the component test associated with the selected indicator on the vehicle.

A fifth additional method including the functions of the set 180 includes: (i) receiving a selection of the at least one indicator that represents the breach of the threshold associated with the second PID of the set of associated PIDs, and (ii) responsive to the selection of the at least one indicator, displaying, on the display interface, a second graph of parameters corresponding to the second PID of the set of associated PIDs, wherein the second graph shows the parameter corresponding to the second PID breaching the threshold associated with the second PID.

A sixth additional method including the functions of the set 180 includes displaying, on the display interface, a graph view slider. Particularly, the graph view slider can be configurable to modify a view of the first graph of parameters corresponding to the first PID on the display interface.

VI. Conclusion

Example embodiments have been described above. Those skilled in the art will understand that changes and modifications can be made to the described embodiments without departing from the true scope and spirit of the present invention, which is defined by the claims. For instance, although many of the example embodiments are described with respect to a vehicle and a vehicle service tool, the person skilled in the art will understand that the vehicle referred to herein can be replaced by some other serviceable device such as, but not limited to, medical equipment, appliances (e.g., refrigerators or washing machines), or televisions. In such instance, the vehicle service tools described herein can be referred to more simply as a "service tool."

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

Embodiments of the present disclosure may thus relate to one of the enumerated example embodiments (EEEs) listed below.

EEE 1 is a method comprising: receiving, at a computing system, parameters from a vehicle, wherein the parameters correspond to a set of associated parameter identifiers (PIDs); determining, by the computing system, one or more thresholds for one or more PIDs of the set of associated PIDs; determining, by the computing system, one or more indicators displayable on a first graph of parameters corresponding to a first PID of the set of associated PIDs, wherein at least one indicator of the one or more indicators represents a parameter corresponding to a second PID of the set of associated PIDs breaching a threshold associated with the second PID; and displaying, by the computing system on a graphical user interface, the first graph of parameters corresponding to the first PID and the one or more indicators on the first graph.

EEE 2 is the method of EEE 1, further comprising: receiving, by the computing system, a selection of an indicator of the one or more indicators; and responsive to the selection of the indicator, displaying, by the computing system on the graphical user interface, a representation of options associated with the selected indicator.

EEE 3 is the method of EEE 2, wherein displaying the representation of options associated with the selected indicator comprises: displaying the representation of options as a popup box in a foreground on the graphical user interface.

EEE 4 is the method of EEE 3, wherein the popup box is displayed in front of a portion of the first graph of parameters corresponding to the first PID of the set of associated PIDs.

EEE 5 is the method of EEEs 3, wherein the popup box is displayed to a side of the first graph of parameters corresponding to the first PID of the set of associated PIDs.

EEE 6 is the method of any one of EEEs 2 to 5, wherein the options include a first option, and wherein a selection of the first option causes the computing system to display another graph of parameters corresponding to another PID associated with the selected indicator.

EEE 7 is the method of EEE 6, further comprising: receiving, by the computing system, a selection of the first option; and responsive to receiving the selection of the first option, displaying, by the computing system, a graph of parameters that corresponds to a given PID associated with the selected indicator.

EEE 8 is the method of any one of EEEs 2 to 7, wherein the options include a second option, and wherein a selection of the second option causes the computing system to perform, on the vehicle, a functional test associated with the selected indicator.

EEE 9 is the method of EEE 8, further comprising: receiving, by the computing system, a selection of the second option; and responsive to receiving the selection of the second option, performing, by the computing system, the functional test associated with the selected indicator on the vehicle.

EEE 10 is the method of any one of EEEs 2 to 9, wherein the options further include a third option, and wherein a selection of the third option causes the computing system to switch to a component meter mode for performing a component test associated with the selected indicator.

EEE 11 is the method of EEE 10, further comprising: receiving, by the computing system, a selection of the third option; responsive to receiving the selection of the third option, switching, by the computing system, to the component meter mode; and performing, by the computing system, the component test associated with the selected indicator on the vehicle.

EEE 12 is the method of any one of EEEs 1 to 11, further comprising: receiving, by the computing system, a selection of the at least one indicator that represents the breach of the threshold associated with the second PID of the set of associated PIDs; and responsive to the selection of the at least one indicator, displaying, by the computing system on the graphical user interface, a second graph of parameters corresponding to the second PID of the set of associated PIDs, wherein the second graph shows the parameter corresponding to the second PID breaching the threshold associated with the second PID.

EEE 13 is the method of any one of EEEs 1 to 12, wherein displaying, by the computing system on the graphical user interface, the first PID and the one or more indicators comprises: displaying the one or more indicators based on a temporal order.

EEE 14 is the method of any one of EEEs 1 to 13, wherein the one or more indicators are displayed as vertical cursors on the first graph of parameters corresponding to the first PID.

EEE 15 is the method of any one of EEEs 1 to 14, wherein the one or more indicators includes a first type of indicator and a second type of indicator, wherein the first type of indicator is visually different from the second type of indicator.

EEE 16 is the method of EEE 15, wherein the first type of indicator is displayed as a vertical cursor having a first color, and wherein the second type of indicator is displayed as a vertical cursor having a second color.

EEE 17 is the method of any one of EEEs 1 to 16, wherein the one or more indicators are displayed with corresponding flags representative of information associated with each indicator.

EEE 18 is the method of any one of EEEs 1 to 17, further comprising: displaying, by the computing system on the graphical user interface, a graph view slider, wherein the graph view slider is configurable to modify a view of the first graph of parameters corresponding to the first PID on the graphical interface.

EEE 19 is the method of any of EEEs 2 to 12, wherein the options further include a fourth option, and wherein a selection of the fourth option causes the computing system to add information to a service record for servicing the vehicle with respect to a given PID associated with the selected indicator.

EEE 20 is the method of EEE 19, further comprising: receiving, by the computing system, a selection of the fourth option; and responsive to receiving the selection of the fourth option, adding, by the computing system, information to the service record for servicing the vehicle with respect to the given PID associated with the selected indicator.

EEE 21 is a system comprising: a graphical user interface; one or more processors; a non-transitory computer readable medium; and program instructions stored on the non-transitory computer readable medium and executable by the one or more processors to cause a set of functions to be performed, the set of functions comprising a method in accordance with any one of EEEs 1 to 20.

EEE 22 is a computer readable medium storing program instructions, that when executed by one or more processors, cause a set functions to be performed, the set of functions comprising a method in accordance with any one of EEEs 1 to 20.

I claim:

1. A system comprising:

a communication interface configured to communicatively couple to a vehicle; and a computing device configured to:

receive, via the communication interface, parameters corresponding to a set of associated parameter identifiers (PIDs);

determine one or more indicators displayable on a first graph of parameters representing a first PID of the set of associated PIDs, wherein each indicator represents one or more parameters corresponding to a second PID of the set of associated PIDs;

display, on a graphical user interface, the first graph of parameters representing the first PID such that the first graph includes the one or more indicators representing the one or more parameters corresponding to the second PID;

receive a selection of an indicator from the one or more indicators; and responsive to receiving the selection of the indicator, display, on the graphical user interface, a representation of options associated with the selected indicator.

2. The system of claim 1, wherein the computing device is configured to display the representation of options as a popup box in a foreground on the graphical user interface.

3. The system of claim 2, wherein the popup box is displayed in front of a portion of the first graph.

4. The system of claim 2, wherein the popup box is displayed to a side of the first graph.

5. The system of claim 2, where the representation of options associated with the selected indicator include a first option, and wherein a selection of the first option causes the computing device to display a second graph of parameters corresponding to the second PID.

6. The system of claim 5, wherein the computing device is further configured to:

receive, at the computing device, a selection of the first option; and responsive to receiving the selection of the first option, display the second graph.

7. The system of claim 6, wherein the representation of options associated with the selected indicator includes a second option, and wherein a selection of the second option causes the computing device to perform a functional test associated with the selected indicator on the vehicle.

8. The system of claim 7, wherein the computing device is further configured to:

receive a selection of the second option; and responsive to receiving the selection of the second option, perform the functional test associated with the selected indicator on the vehicle.

9. The system of claim 8, wherein the representation of options associated with the selected indicator includes a third option, and wherein a selection of the third option causes the computing device to perform a component test associated with the selected indicator on the vehicle.

10. The system of claim 9, wherein the computing device is further configured to:

receive a selection of the third option; and responsive to receiving the selection of the third option, perform the component test associated with the selected indicator on the vehicle.

11. The system of claim 1, further comprising:

a structural housing enclosing the computing device, wherein the graphical user interface is structurally coupled to the structural housing.

12. The system of claim 1, wherein the communication interface is configured to communicatively couple to the vehicle via a wired connection.

13. The system of claim 1, wherein at least one indicator of the one or more indicators that represents a parameter corresponding to the second PID breaching a threshold associated with the second PID.

14. The system of claim 13, wherein the computing device is further configured to:

receive a selection of the at least one indicator that represents the parameter corresponding to the second PID breaching the threshold associated with the second PID; and responsive to receiving the selection of the at least one indicator, display, on the graphical user interface, a second graph of parameters corresponding to the second PID such that the second graph shows the parameter corresponding to the second PID breaching the threshold associated with the second PID.

15. The system of claim 1, wherein the computing device is configured to display the one or more indicators on the first graph in a temporal order.

16. The system of claim 1, wherein the computing device is configured to display the one or more indicators as vertical cursors on the first graph.

17. The system of claim 1, wherein the one or more indicators includes a first type of indicator and a second type of indicator, and wherein the first type of indicator is visually different from the second type of indicator.

18. A method comprising:

receiving, via a communication interface, parameters corresponding to a set of associated parameter identifiers (PIDs);

determining one or more indicators displayable on a first graph of parameters representing a first PID of the set of associated PIDs, wherein each indicator represents one or more parameters corresponding to a second PID of the set of associated PIDs; and displaying, by the computing device and on a graphical user interface, the first graph of parameters representing the first PID such that the first graph includes the one or more indicators representing the one or more parameters corresponding to the second PID;

receiving a selection of an indicator from the one or more indicators; and responsive to receiving the selection of the indicator, displaying, on the graphical user interface, a representation of options associated with the selected indicator.

19. A non-transitory computer readable medium having stored therein instructions executable by one or more processors to cause a computing system to perform functions comprising:

receiving, via a connection between a communication interface and a vehicle, parameters corresponding to a set of associated parameter identifiers (PIDs);

determining one or more indicators displayable on a first graph of parameters representing a first PID of the set of associated PIDs, wherein each indicator represents one or more parameters corresponding to a second PID of the set of associated PIDs; and displaying, on a graphical user interface, the first graph of parameters representing the first PID such that the first graph includes the one or more indicators representing the one or more parameters corresponding to the second PID;

receiving a selection of an indicator from the one or more indicators; and responsive to receiving the selection of the indicator, displaying, on the graphical user interface, a representation of options associated with the selected indicator.

* * * * *